United States Patent
Takagi et al.

(10) Patent No.: US 7,526,187 B2
(45) Date of Patent: *Apr. 28, 2009

(54) PROCESSING DIGITAL DATA HAVING VARIABLE PACKET LENGTHS

(75) Inventors: Satoshi Takagi, Kanagawa (JP); Satoshi Miyazawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 991 days.

This patent is subject to a terminal disclaimer.

(21) Appl. No.: 11/092,436

(22) Filed: Mar. 28, 2005

(65) Prior Publication Data

US 2005/0191040 A1    Sep. 1, 2005

Related U.S. Application Data

(63) Continuation of application No. 09/581,801, filed on Jun. 16, 2000, now Pat. No. 7,006,760.

(51) Int. Cl.
    H04N 5/76    (2006.01)
(52) U.S. Cl. .................. 386/111; 386/124; 386/E9.014; 386/E9.015
(58) Field of Classification Search ................. 386/111, 386/124, E9.014, E9.015, 33, 37, 40; 375/240.04
See application file for complete search history.

(56) References Cited

U.S. PATENT DOCUMENTS

| | | | |
|---|---|---|---|
| 5,473,479 A | 12/1995 | Takakura | |
| 5,724,097 A * | 3/1998 | Hibi et al. | 375/240.04 |
| 5,781,690 A | 7/1998 | Juri et al. | |
| 6,549,717 B2 | 4/2003 | Mishima et al. | |
| 6,654,544 B1 | 11/2003 | Suzuki et al. | |
| 2003/0091339 A1 | 5/2003 | Isozaki | |

FOREIGN PATENT DOCUMENTS

| | | |
|---|---|---|
| EP | 0 527 611 | 2/1993 |
| JP | 5-234261 | 9/1993 |

* cited by examiner

*Primary Examiner*—David E Harvey
(74) *Attorney, Agent, or Firm*—Frommer Lawrence & Haug LLP; William S. Frommer; Thomas F. Presson

(57) ABSTRACT

When macro blocks each of which has a variable length are input for one picture, null syncs each of which has a unit length are generated corresponding to the format of the video data to be handled. Corresponding to the length information, an overflow portion of a macro block is detected. The overflow portion is successively packed to macro blocks each of which is smaller than the unit length. Thus, each macro block is packed in the unit length. Since the length information of each null sync represents 0, the overflow portions are packed after the length information of each null sync. With null syncs, one format of video data can be matched with another format. In addition, with null syncs, overflow portions are packed. Thus, the record medium can be effectively used.

1 Claim, 14 Drawing Sheets

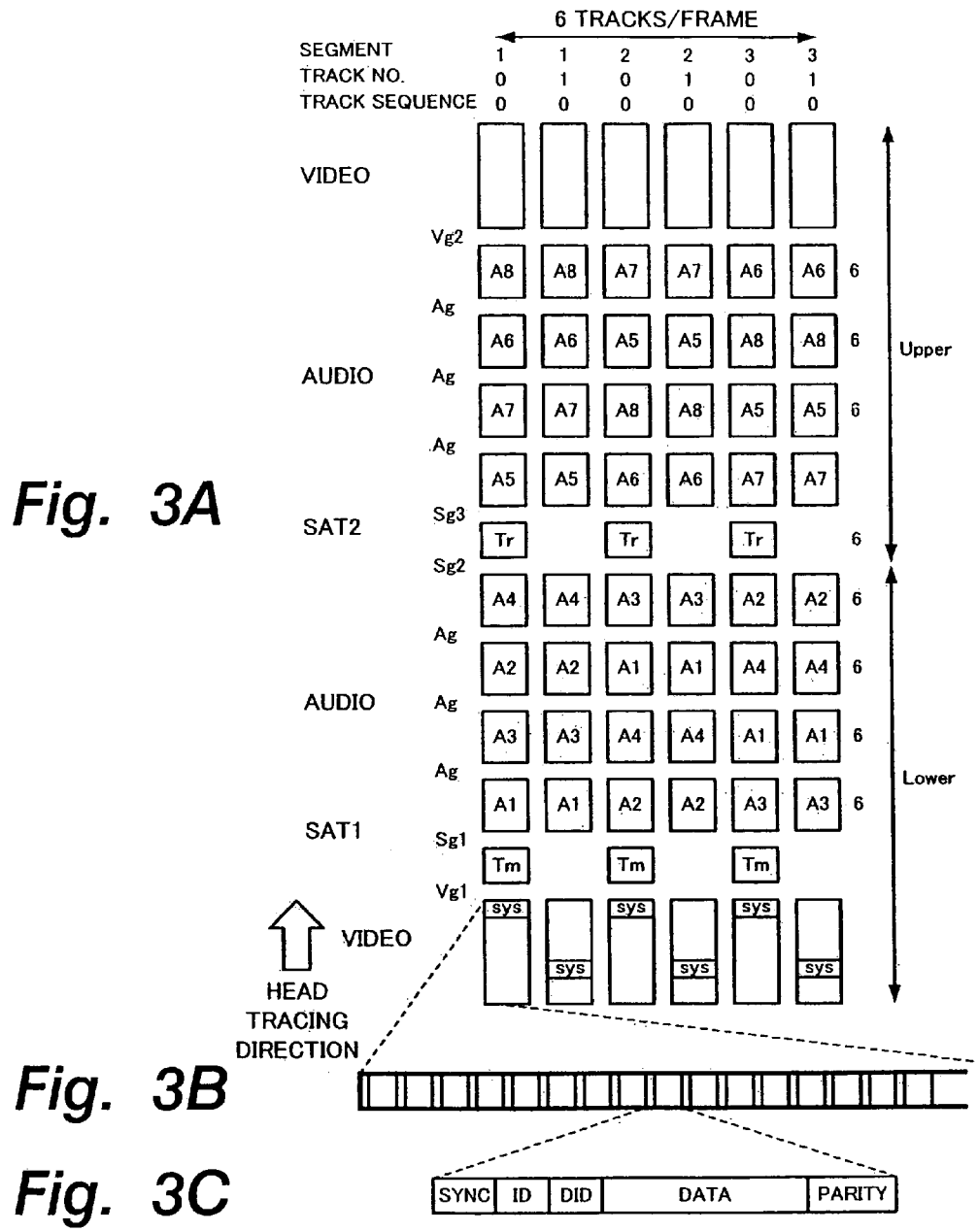

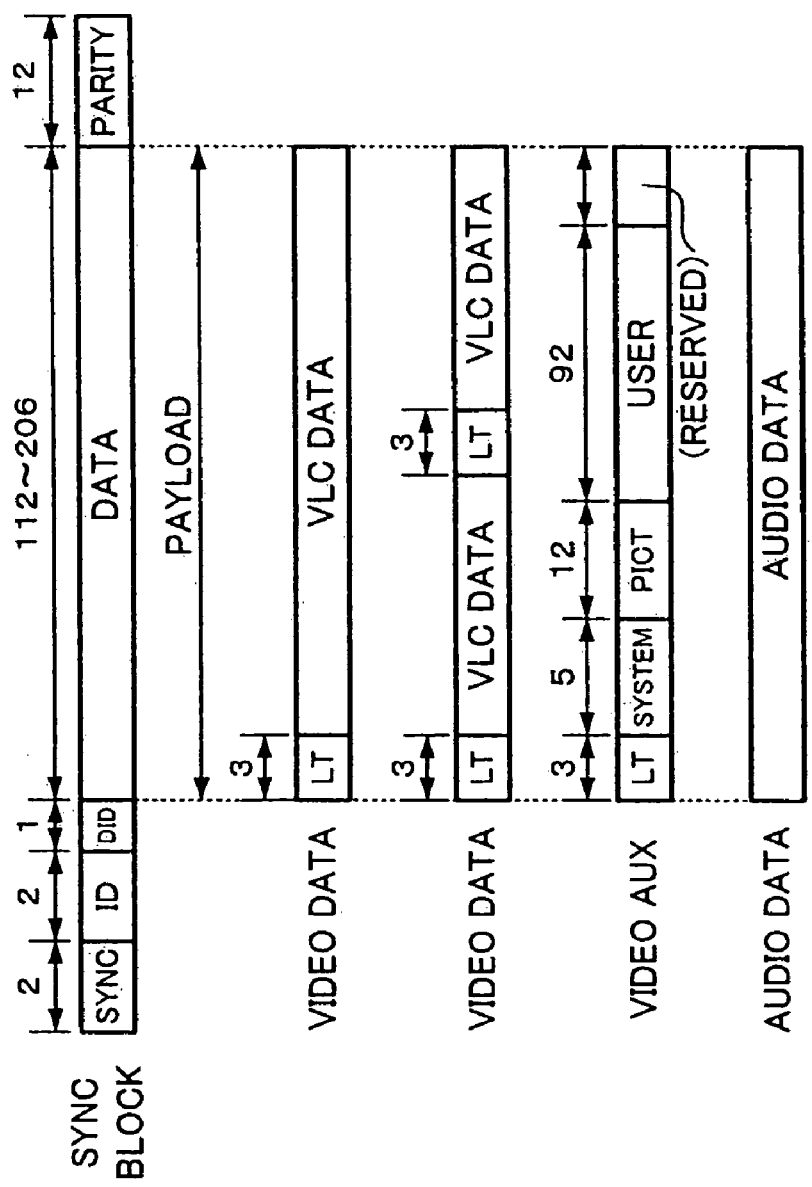

| MSB | ID0 | ID1 |
|---|---|---|
| 7 | SYNC ID7 | Upper/Lower |
| 6 | SYNC ID6 | (Reserrvel) |
| 5 | SYNC ID5 | SEG NB3 |
| 4 | SYNC ID4 | SEG NB2 |
| 3 | SYNC ID3 | SEG NB1 |
| 2 | SYNC ID2 | SEG NB0 |
| 1 | SYNC ID1 | TRACK |
| 0 | SYNC ID0 | VIDEO/AUDIO |

LSB

| DID(VIDEO) |
|---|
| (Reserrvel) |
| (Reserrvel) |
| (Reserrvel) |
| (Reserrvel) |
| PAYLOAD MD1 |
| PAYLOAD MD0 |
| 2MB/1MB |
| Vouter |

| DID(AUDIO) |
|---|
| (Reserrvel) |
| (Reserrvel) |
| (Reserrvel) |
| (Reserrvel) |
| DATA/AUDIO |
| 5F Seg2 |
| 5F Seg1 |
| 5F Seg0 |

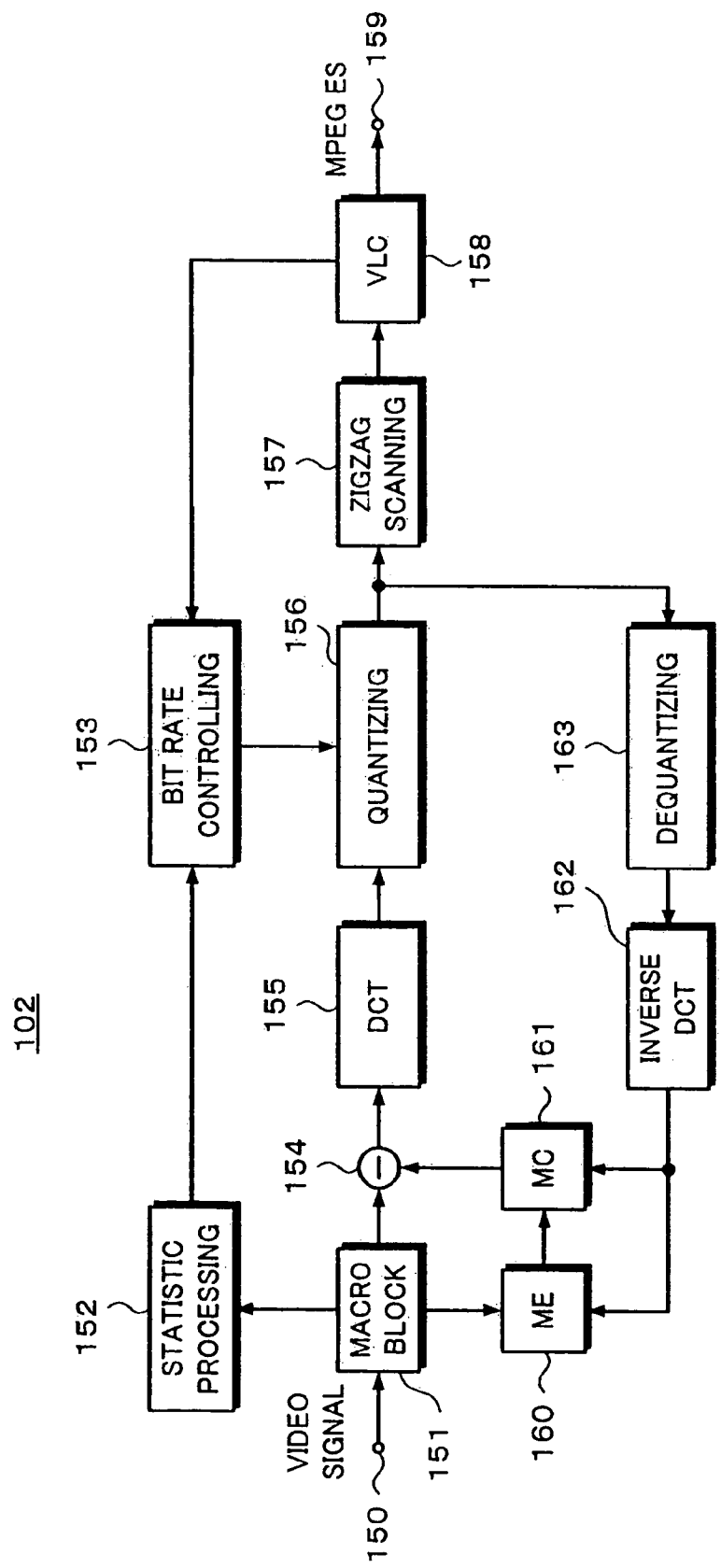

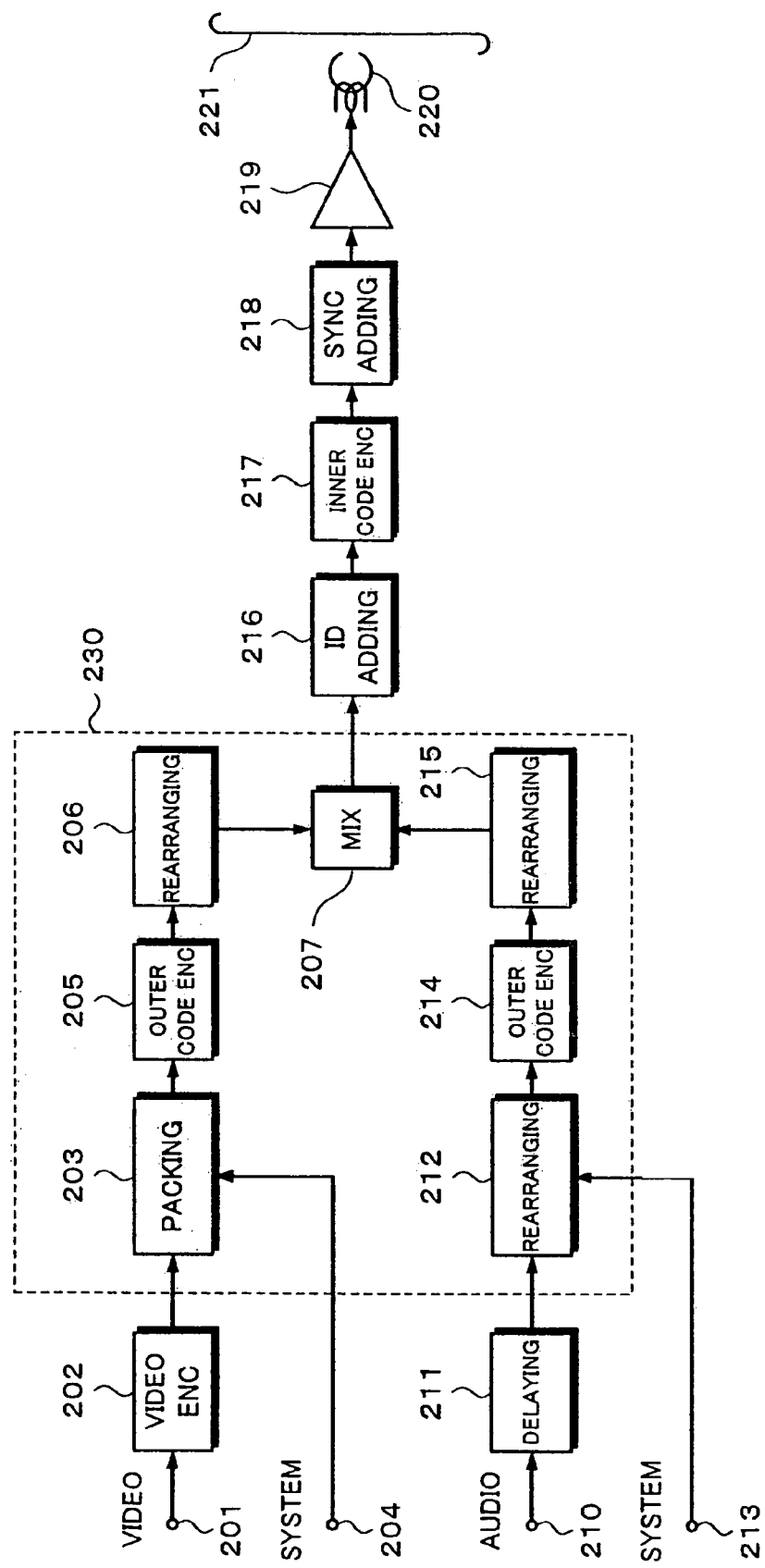

PROCESSING DIGITAL DATA HAVING VARIABLE PACKET LENGTHS

This is continuation of application Ser. No. 09/581,801 filed Jun. 16, 2000 now U.S. Pat. No. 7,006,760, the entirety of which is incorporated herein by reference.

TECHNICAL FIELD

The present invention relates to a data processing apparatus, a data processing method, a recording apparatus, and a recording method that are suitable for use in a broadcasting station and that allow video signals of a plurality of different formats to be integrally handled.

RELATED ART

In recent years, as digital broadcasts have been started, various picture formats have been proposed. In addition to a conventional 29.97 Hz (frame frequency), 480 line×320 pixel (number of effective lines×number of effective horizontal pixels) interlace-scanned format and a conventional 25 Hz (frame frequency), 576 line×384 pixel interlace-scanned format, more than ten different formats as combinations of data rates of video signal (25 Mbps), scanning modes (interlaced or progressive), and frame frequencies (23.976 Hz, 25 Hz, 29.97 Hz, 50 Hz, and 59.94 Hz) have been proposed.

As various picture formats have been proposed, a so-called multi-rate type video tape recorder that can integrally handle such picture formats has been desired.

On the other hand, in recent years, digital video recorders that record digital video signals and digital audio signals to magnetic tapes are becoming, common. Such a digital video tape recorder uses a so-called helical scanning system of which inclined tracks are formed on a magnetic tape by a magnetic head disposed on a rotating drum.

In particular, since the data amount of a digital video signal is large, data is compression-encoded with variable length code. The encoded data is recorded in a fixed length that is an editing unit of for example of one frame period. The fixed length data is placed in a packet having a predetermined size. Information that represents the contents of the packet and an error correction code are added to the packet. The resultant packet is referred to as data block. A sync pattern for detecting synchronization and a block ID for identifying a block are added to the data block. The resultant data block is referred to as sync block. Sync blocks are grouped corresponding to the data types contained therein. Sync blocks are transmitted as serial data for each group and recorded on a magnetic tape.

Conventionally, there is only one type of length of each sync block that is the minimum record unit of data recorded on a magnetic tape. Now, the above-mentioned multi-rate video tape recorder is considered. Tracks are formed on a magnetic tape corresponding to each frame so that data can be easily edited. Thus, the length of each sync block closely relates to the frame frequency and the data amount. Thus, it is very difficult to select an optimum length of each sync block corresponding to each of a plurality of formats.

In addition, conventionally, a signal processing circuit that handles a plurality of formats cannot be accomplished with a single structure. Thus, conventionally, to accomplish a multi-rate video tape recorder, it is necessary to provide a plurality of signal processing circuits corresponding to the number of formats to be handled. Consequently, the circuit scale of the multi-rate video tape recorder becomes large and thereby the cost thereof rises.

In addition, the number of sync blocks in one track depends on the data rate of a video signal and an audio signal. Thus, the number of sync blocks just depends on the length of each sync block. Consequently, since the data rate cannot be flexibly varied corresponding to the multi-rates, the multi-rate video tape recorder cannot be accomplished.

A method for solving such a problem has been proposed. In the proposed method, with dummy sync blocks that do not contain video data or the like, the number of sync blocks is varied corresponding to each format. In this method, with dummy sync blocks that do not contain data, the record data amount per track is adjusted so that a plurality of formats can be easily handled.

When a video tape recorder that records and reproduces a digital video signal is used in a broadcasting station or the like, the digital video signal should be recorded and reproduced in higher picture quality than others. When a digital video signal is recorded in high quality, even if the digital video signal is compression-encoded with variable length code, the amount of data recorded on a record medium becomes large. Thus, a recording apparatus that allows a digital video signal to be recorded effectively to a record medium in high quality has been desired.

DISCLOSURE OF THE INVENTION

Therefore, an object of the present invention is to provide a data processing apparatus, a data processing method, a recording apparatus, and a recording method that allow a record medium to be effectively used with dummy sync blocks and a digital video signal to be recorded in high quality.

To solve the above-described problem, the present invention is a data processing apparatus for packing digital data that has a various length to blocks each of which has a unit length, comprising a means for packing data packets each of which has a variable length to a plurality of first blocks from the beginning thereof and packing an overflow portion of a data packet that is larger than the unit length to a blank portion of the first blocks to which a data block that is smaller than the unit length has been packed, and a means for generating a second block that contains a data packet whose length is 0 and the overflow portion.

The present invention is a data processing method for packing digital data that has a various length to blocks each of which has a unit length, comprising the steps of packing data packets each of which has a variable length to a plurality of first blocks from the beginning thereof and packing an overflow portion of a data packet that is larger than the unit length to a blank portion of the first blocks to which a data block that is smaller than the unit length has been packed, and generating a second block that contains a data packet whose length is 0 and the overflow portion.

The present invention is a recording apparatus for packing digital data that is input as packets each of which has a variable length to a block having a unit length of an error correction encoding process and encoding the packed block with error correction code that is a product code, comprising a means for packing data packets each of which has a variable length to a plurality of first blocks from the beginning thereof and packing an overflow portion of a data packet that is larger than the unit length to a blank portion of the first blocks to which a data block that is smaller than the unit length has been packed, a means for generating a second block that contains a data packet whose length is 0 and the overflow portion, a record data forming means for encoding a data block composed of a plurality of first blocks and a plurality of second blocks with error correction code that is a product code, adding a synchronous pattern and an ID to each block having the unit length, and forming record data, and a recording means for recording the record data formed by the record data forming means to a record medium.

The present invention is a recording method for packing digital data that is input as packets each of which has a variable length to a block having a unit length of an error correction encoding process and encoding the packed block with error correction code that is a product code, comprising the steps of (a) packing data packets each of which has a variable length to a plurality of first blocks from the beginning thereof and packing an overflow portion of a data packet that is larger than the unit length to a blank portion of the first blocks to which a data block that is smaller than the unit length has been packed, (b) generating a second block that contains a data packet whose length is 0 and the overflow portion, (c) encoding a data block composed of a plurality of first blocks and a plurality of second blocks with error correction code that is a product code, adding a synchronous pattern and an ID to each block having the unit lengths and forming record data, and (d) recording the record data formed at step (c) to a record medium.

As described above, data packets each of which has a variable length are packed to a plurality of first blocks from the beginning thereof. An overflow portion of a data packet that is larger than the unit length is packed to a blank portion of the first blocks to which a data block that is smaller than the unit length has been packed. A second block that contains a data packet whose length is 0 and the overflow portion is generated. Thus, data of the overflow portion can be more packed.

BRIEF DESCRIPTION OF DRAWINGS

FIGS. 3A to 3C are schematic diagrams showing another example of the track format;

FIGS. 4A to 4E are schematic diagrams showing examples of a sync-block;

FIGS. 5A to 5C are schematic diagrams showing examples of bit assignments for an ID and an DID;

FIG. 6 is a block diagram showing an example of the structure of an MPEG encoder;

FIG. 10 is a block diagram showing a packing circuit and an ECC encoder on a recording side of the recording and reproducing apparatus according to the embodiment;

FIGS. 13A to 13C are schematic diagrams showing examples of a packing process using null packets; and FIGS. 14A and 14B are schematic diagrams showing another example of the packing process using null packets.

BEST MODES FOR CARRYING OUT THE INVENTION

Figure 1:
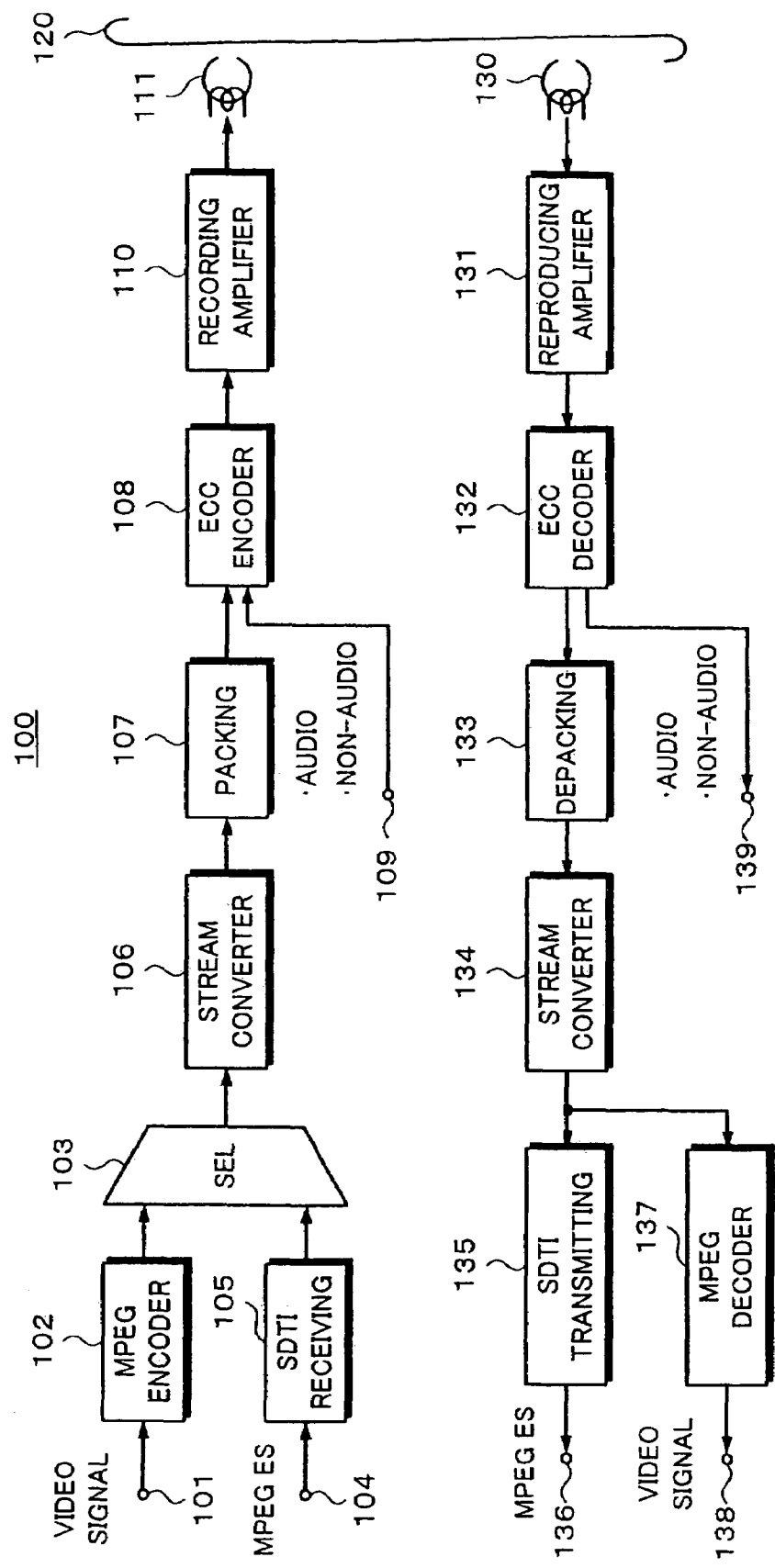
FIG. 1 is a block diagram showing an example of the structure of a recording and reproducing apparatus according to an embodiment of the present invention.

Next, an embodiment of the present invention will be described. According to the present invention, a sync block that contains a data packet whose length information is [0] is defined. This sync block is referred to as null sync. In the null sync, the length information is followed by data that is filled with [00]s. The null sync except for the length information is filled with [00]s. With null syncs, the number of sync blocks becomes flexible corresponding to a plurality of picture formats. Thus, video signals of a plurality of formats can be integrally recorded.

In the recording and reproducing apparatus according to the embodiment of the present invention, video signals of a plurality of formats can be integrally handled. For example, video signals of the NTSC 525 line/60 Hz format and the PAL 625 line/50 Hz format can be integrally handled. In addition, digital TV broadcast signals of interlace-scanned 1080-line format (hereinafter referred to as 1080i format), a progressive noninterlace-scanned 480-line format (hereinafter referred to as 480p format), a progressive noninterlace-scanned 720-line format (hereinafter referred to as 720p format), and a progressive noninterlace-scanned 1080-line format (hereinafter referred to as 1080p format) can be integrally handled. In other words, with almost the same hardware, video signals of different formats can be recorded and reproduced.

According to the embodiment, a video signal and an audio signal are compression-encoded corresponding to the MPEG2 (Moving Picture Experts Group Phase 2) standard. As well known, the MPEG2 standard is a standard defined as a combination of a motion compensation predictive encoding process and a DCT (Discrete Cosine Transform) compression encoding process. The data structure of the MPEG2 standard is a hierarchical structure having a block layer (lowest layer), a macro block layer, a slice layer, a picture layer, a GOP layer, and a sequence layer (highest layer).

The block layer is composed of DCT blocks. The DCT process is performed for each DCT block. The macro block layer is composed of a plurality of DCT blocks. The slice layer is composed of a header portion and any number of macro blocks that are placed on one line, not on two successive lines. The picture layer is composed of a header portion and a plurality of slices. One picture is equivalent to one screen. The GOP (Group Of Picture) layer is composed of a header portion, an I picture (as an intra-frame coded picture), a P picture (as a predictively coded picture), and a B picture (as a predictively coded picture). Each GOP contains at least one I picture. In other words, each GOP may not contain a P picture and/or a B picture. The sequence layer (which is the highest layer) is composed of a header portion and a plurality of GOPs.

In the MPEG format, a slice is one variable length code sequence. The variable length code sequence is a sequence of which the boundary of data cannot be detected unless variable length code is decoded.

At the beginning of each of the sequence layer, the GOP layer, the picture layer, the slice layer, and the macro block layer, an identification code composed of a predetermined number of bytes is placed (the identification code is referred to as start code). The header portion of each layer contains a header, extension data, or user data. The header portion is a variable length code sequence.

The header of the sequence layer contains the size of a picture (the number of pixels in the vertical direction and the horizontal direction). The header of the GOP layer contains a time code and the number of pictures of the GOP.

Each of the macro blocks contained in the slice layer is a set of a plurality of DCT blocks. An encoded sequence of DCT blocks is composed in such a manner that a sequence of quantized DCT coefficients is encoded as sets of the number of 0 coefficients (run) and a non-0 coefficient (level) (that will be described later in detail). An identification code arranged as a predetermined number of bytes is not added to each macro block and each DCT block thereof. In other words, each macro block and each DCT block are not variable length code sequences.

As will be described later, a macro block is an element of which a picture is divided by 16 pixels×16 lines as a matrix. A slice is composed of macro blocks that are horizontally connected. The last macro block of one slice of two successive slices and the top macro block of the other slice thereof are successive. Macro blocks that overlap between two successive slices are prohibited.

According to the MPEG2 standard, unless data is arranged as macro blocks, the data cannot be decoded as picture data. The number of macro blocks depends on the size of a picture.

To prevent a signal from deteriorating in a decoding process and an encoding process, it is preferred to edit encoded data. At this point, a P picture requires a picture that is chronologically preceded by the P picture. On the other hand, a B picture requires a picture that is chronologically preceded by the B picture and a picture that is chronologically followed by the B picture. Thus, data cannot be edited for each frame. From this point of view, according to the embodiment, one GOP is composed of one I picture.

A record area of record data for one frame is predetermined. In the MPEG2 standard, since the variable length code encoding process is used, the data amount for one frame is fixed so that data generated in one frame period is recorded in a predetermined record area.

In addition, according to the embodiment, one slice is composed of one macro block. In addition, one macro block is placed in a fixed data frame having a predetermined length so that data can be properly recorded to a magnetic tape.

FIG. 1 shows an example of the structure of a recording and reproducing apparatus 100 according to the embodiment. First of all, the structure of the recording and reproducing apparatus 100 will be described in brief. When data is recorded, a digital video signal of a predetermined format is input from a terminal 101. The input video signal is sent to an MPEG encoder 102. The MPEG encoder 102 performs a variable length code encoding process for the video signal and outputs the encoded data as variable length code (VLC) data. The variable length code data supplied from the MPEG encoder 102 is an elementary stream (ES) corresponding to the MPEG2 (Moving Picture Experts Group Phase 2) standard. The variable length code data is sent to a first input terminal of a selector 103.

On the other hand, data in the format of SDTI (Serial Data Transport Interface) that is an interface defined in ANSI/SMPTE 305M is input to an input terminal 104 so that various formats can be used. A signal containing an elementary stream corresponding to the MEPG2 standard is input from the terminal 104. A synchronization of this signal is detected by an SDTI receiving circuit 105. The signal is temporarily stored in a buffer. In the buffer, the elementary stream is extracted from the signal. The extracted elementary stream is sent to a second input terminal of the selector 103.

An elementary stream that is selected and output by the selector 103 is sent to a stream converter 106. As will be described later, the stream converter 106 rearranges DCT coefficients arranged in the order of frequency components in each of DCT blocks defined corresponding to the MPEG2 standard to those in the order of frequency components of all DCT blocks of one macro block. The rearranged elementary stream is sent to a packing circuit 107.

Since video data in the elementary stream has been encoded with variable length code, the data lengths of macro blocks are different. The packing circuit 107 packs each macro block in fixed data frames. At this point, a portion that overflows from a fixed data frame is successively packed in a blank portion against the size of a fixed data frame. The portion that overflows from a fixed data frame is referred to as overflow portion. The packed data is supplied to an ECC encoder 108.

A packed video signal is supplied to the ECC (Error Correction Coding) encoder 108. In addition, a digital audio signal is supplied from for example a terminal 109 to the ECC encoder 108. According to the embodiment, a non-compressed digital audio signal is handled. The ECC encoder 108 shuffles these signals for each sync block. Since the signals are shuffled, data is equally placed as a pattern of a tape. In addition, an inner code parity and an outer code parity are added to the data so as to perform an error correction code encoding process using a product code. A sync pattern (for detecting a synchronization), an ID (identifying a sync block), and a DID (representing the contents of recorded data) are added to the data that has been encoded with error correction code. The sync pattern, the ID, and the DID will be descried later in detail.

An output signal of the ECC encoder 108 is supplied to a record encoding circuit (not shown). The record encoding circuit performs for example a channel-encoding process for converting the signal received from the ECC encoder 108 into a signal of a proper record format. An output signal of the record encoding circuit is supplied to a recording amplifier 110. The recording amplifier 110 amplifies the signal received from the record encoding circuit. The amplified signal is supplied to a recording head 111. The recording head 111 records the record signal on a magnetic tape 120 in a helical scanning method. The recording method and the format will be described later in detail.

When data is reproduced, a signal recorded on the magnetic tape 120 is reproduced by a reproducing head 130. The reproduced signal is supplied to a reproducing amplifier 131. The reproducing amplifier 131 equalizes the reproduced signal and trims the wave shape thereof. The resultant data is supplied to a decoding circuit (not shown). The decoding circuit converts the reproduced signal into a digital signal. The reproduced digital signal that is output from the reproducing amplifier 131 is supplied to an ECC decoder 132.

The ECC decoder 132 detects a synchronization corresponding to a sync pattern contained in the reproduced signal and extracts a sync block therefrom. Corresponding to the error correction code contained in the reproduced signal, the ECC decoder 132 corrects an error thereof. When the ECC decoder 132 cannot correct an error of the data, the ECC decoder 132 places an error flag thereto. Thereafter, the ECC decoder 132 shuffles the reproduced signal and rearranges the data to the original data.

Video data is output from the ECC decoder 132 to a depacking circuit 133. The depacking circuit 133 depacks data of each macro block that has been packed when data has been recorded. In other words, the depacking circuit 133 restores the original variable length code. When the ECC decoder 132 has placed the error flag to the data, a concealing circuit (not shown) corrects the data that has not been corrected against an error in such a manner that [0] is filled in all data or data of the current frame is substituted with data of the preceding frame. In addition, the ECC decoder 132 corrects an error of audio data. Audio data is output to for example a terminal 139.

An output signal of the depacking circuit 133 is supplied to a stream converter 134. The stream converter 134 performs the reverse process of the above-described stream converter 106. In other words, the stream converter 134 rearranges DCT coefficients arranged in the frequency components of all DCT blocks to those in the order of frequency components of each DCT block. Thus, the reproduced signal is converted into an elementary stream corresponding to the MEPG2 standard.

The elementary stream is supplied to an SDTI transmitting circuit 135. The SDTI transmitting circuit 135 converts the elementary stream into data of an SDTI format. The data of the SDTI format is output from a terminal 136. In addition, the elementary stream is supplied to an MPEG decoder 137. The MPEG decoder 137 decodes the elementary stream corresponding to the MPEG2 standard and outputs a digital video signal. The digital video signal is output from a terminal 138.

According to the embodiment, signals are recorded on a magnetic tape in the helical scanning method. In the helical scanning method, inclined tracks are formed by magnetic heads disposed on a rotating head. A plurality of heads are disposed at opposite positions on the rotating drum. In the case that a magnetic tape is wound to the rotating head with a winding angle of around 180°, when the rotating head is turned by 180°, a plurality of tracks can be formed at a time. Two magnetic heads with different azimuths are disposed as one set on the rotating drum so that adjacent tracks have different azimuths.

Figure 2:
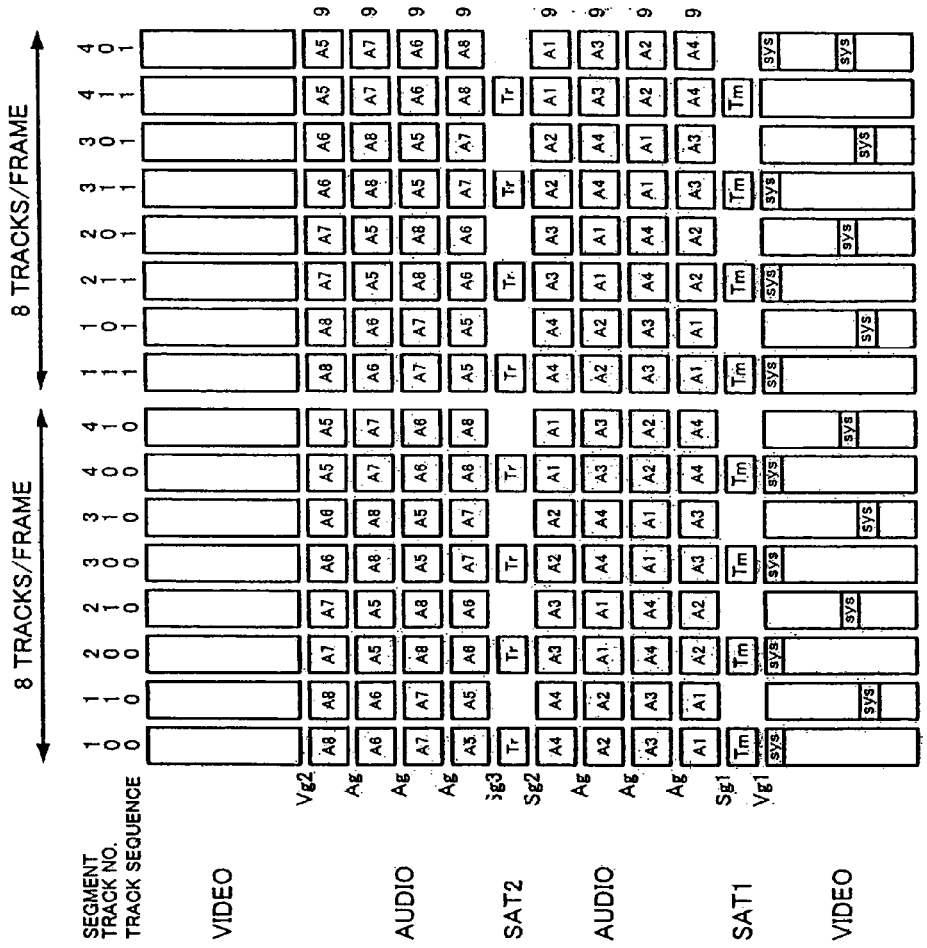
FIG. 2 is a schematic diagram showing an example of a track format.

FIG. 2 shows an example of the track format formed on a magnetic tape by the above-described rotating head. In this example, video data and audio data for one frame are recorded with eight tracks. For example, the 480i video signal of which the frame frequency is 29.97 Hz, the data rate is 50 Mbps, the number of effective lines is 480, and the number of effective horizontal pixels is 720 is recorded along with an audio signal. In addition, the 576i video signal of which the frame frequency is 25 Hz, the data rate is 50 Mbps, the number of effective lines is 576, and the number of effective horizontal pixels is 720 can be recorded along with an audio signal in the same tape format as that shown in FIG. 2.

One segment is formed of two tracks with different azimuths. In other words, eight tracks are composed of four segments. A pair of tracks that form a segment are designated track number [0] and track number [1] corresponding to azimuths. In the example shown in FIG. 2, data of one frame is dually recorded. The track numbers of the first eight tracks are different from those of the second eight tracks. A unique track sequence is assigned to each frame. Thus, even if one of paired magnetic heads cannot read data due to clogging or the like, the other can reproduce the data.

Video sectors are formed on both edge sides in the longitudinal direction of each track. An audio sector for audio data is formed between the video sectors. FIGS. 2 to 3C also show the positions of sectors on a tape.

In this example, audio data of eight channels can be handled. A1 to A8 represent audio data of channels 1 to 8, respectively. The positions of audio data of individual channels are varied in each segment. In this example, video data of four error correction blocks per track is interleaved and separately recorded to an upper side sector and a lower side sector. A system area is formed at a predetermined position of each lower side video sector.

In FIG. 2, SAT1 (Tr) and SAT2 (Tm) are areas for servo lock signals. Gaps (Vg1, Sg1, Ag, Sg2, Sg3, and Vg2) having a predetermined size each are formed between adjacent record areas.

In FIG. 2, data of one frame is recorded on eight tracks. However, depending on the format of data to be recorded or reproduced, data of one frame can be recorded on four tracks or six tracks. FIG. 3A shows the format of six tracks per frame. In this example, one frame is not dually recorded. Thus, the track sequence is only [0].

As shown in FIG. 3B, data recorded on a tape is composed of a plurality of blocks that are divided at equal intervals. The blocks are referred to as sync blocks. FIG. 3C shows an outline of the structure of one sync block. As will be described later, one sync block is composed of a sync pattern, an ID, a DID, a data packet, and an error correction inner code parity. The sync pattern is used to detect a synchronization. The ID identifies the current sync block. The DID represents the contents of data that follows. Data is handled as packets corresponding to sync blocks. In other words, the minimum data unit that is recorded and reproduced is one sync block. A sequence of sync blocks (see FIG. 3B) form for example a video sector (se FIG. 3A).

FIGS. 4A to 4E show examples of the structure of a sync block that is the record data unit of each track. According to the embodiment, one sync block contains one or two macro blocks. The size of one sync block depends on the format of a video signal to be handled. As shown in FIG. 4A, one sync block is composed of a sync pattern of two bytes, an ID of two bytes, a DID of one byte, a data area variable in the range from 112 bytes to 206 bytes, and a parity as an inner code parity that are successively arranged. The data area is also referred to as payload.

The sync pattern of two bytes is used to detect a synchronization. The sync pattern has a predetermined bit pattern. By detecting a sync pattern corresponding to a predetermined pattern, a synchronization is detected.

The ID is composed of two portions of ID0 and ID1 that contain information for identifying each sync block. FIG. 5A shows examples of the bit assignments of the ID0 and ID1. The ID0 contains identification information (that is a sync ID) for identifying sync blocks in one track. The sync ID is a serial number. The sync ID is composed of eight bits.

The ID1 contains track information of the sync block. When the MSB side and the LSB side are bit 7 and bit 0, respectively, bit 7 represents the upper side or the lower side of the track. Bits 5 to 2 represent a segment on the track. Bit 1 represents a track number corresponding to a track azimuth. Bit 0 represents whether the sync block is video data or audio data.

The DID contains information of the payload. The contents (video data or audio data) of the DID depend on the value of bit 0 of the ID1. FIG. 5B shows an example of the bit assignment of the DID in the case that the data area of the sync block is video data. Bits 7 to 4 of the DID are reserved. Bits 3 and 2 of the DID represent the mode of the payload. The mode is for example the type of the payload. Bits 3 and 2 of the DID represent auxiliary information. Bit 1 of the DID represents the number of macro blocks placed as the payload. Bit 0 of the DID represents whether or not video data placed in the payload is an outer code parity.

FIG. 5C shows an example of the bit assignment of the DID in the case that the data area of the sync block is audio data. Bits 7 to 4 of the DID are reserved. Bit 3 of the DID represents whether data placed in the payload is audio data or conventional data. When the payload contains compression-encoded audio data, bit 3 of the DID is a value that represents data. Bits 2 to 0 of the DID contain information of the NTSC five-field sequence. In other words, in the NTSC standard, when the sampling frequency is 48 kHz, one field of a video signal is equal to 800 samples or 801 samples of an audio signal. This sequence is completed every five fields. Bits 2 to 0 of the DID represents the position of the sequence.

Returning to FIGS. 4A to 4E, FIGS. 4B to 4E show examples of the payload. In FIGS. 4B and 4C, the payload contains video data of one or two macro blocks (as variable length code encoded data), respectively. In FIG. 4B, the payload contains one macro block. In this case, the first three bytes of the payload contain length information LT that represents the length of the macro block that follows. The length information LT does not contain the length thereof. In FIG. 4C, the payload contains two macro blocks. In this case, the length information LT of the first macro block, the first macro block, the length information LT of the second macro block, and the second macro block are successively placed.

FIG. 4D shows the case that the payload contains video AUX (auxiliary) data. The length information LT represents the length of video AUX data. The length represented by the length information LT excludes the length of the length information LT. The length information LT is followed by system information of five bytes, PICT information of 12 bytes, and user information of 92 bytes. The remaining area of the payload is reserved.

FIG. 4E shows the case that the payload contains audio data. Audio data can be packed in all the length of the payload. The audio data is for example a PCM (Pulse Code Modulation) signal that is not compressed. Alternatively, the payload may handle an audio signal compression-encoded corresponding to a particular method.

According to the embodiment, since the sync block length is variable, the length of each sync block of video data and the length of each sync block of audio data can be optimally designated corresponding to the signal format to be handled. Thus, a plurality of different signal formats can be integrally handled.

Next, each portion of the recording and reproducing apparatus 100 will be described in detail. FIG. 6 shows an example of the structure of the MPEG encoder 102. A signal is supplied from a terminal 150 to a block segmenting circuit 151. The block segmenting circuit 151 segments the input signal into macro blocks each of which is composed of 16 pixels×16 lines. The macro blocks are supplied to a first input terminal of a subtracting device 154. In addition, the macro blocks are supplied to a motion detecting circuit 160. The input picture data is also supplied to a statistic processing circuit 152. The statistic processing circuit 152 performs a predetermined statistic process for the input picture data and calculates the complexity thereof. The calculated result is supplied to a bit rate controlling circuit 153.

The motion detecting circuit 160 compares a macro block supplied from the block segmenting circuit 151 with a macro block supplied through a dequantizing circuit 163 and an inverse DCT circuit 162 (that will be described later) (thus, the macro block supplied from the block segmenting circuit 151 is delayed from the macro block supplied through the dequantizing circuit 163 and the inverse DCT circuit 162 by one frame (or one field)). In other words, the motion detecting circuit 160 performs a block matching operation for these macro blocks and obtains motion information (a motion vector). A motion compensating circuit 161 compensates the motion of the picture data corresponding to the motion information and supplies the compensated result to a second input terminal of the subtracting device 154.

The subtracting device 154 obtains the difference between the input picture data and the motion compensated result and supplies the difference to a DCT circuit 155. The DCT circuit 155 divides the difference as a macro block into DCT blocks each of which is composed of 8 pixels×8 lines. The DCT circuit 155 performs a DCT process for each DCT block and outputs DCT coefficients to an quantizing circuit 156. The quantizing circuit 156 quantizes the DCT coefficients. At this point, the bit rate of the picture data is controlled corresponding to control information received from a bit rate controlling circuit 153. The quantized DCT coefficients are supplied to the dequantizing circuit 163 and a zigzag scanning circuit 157.

The zigzag scanning circuit 157 zigzag-scans the DCT coefficients and arranges frequency components of each DCT block from the DC component to higher frequency components. The resultant DCT coefficients are supplied to a VLC circuit 158. The VLC circuit 158 encodes the DCT coefficients with variable length code. The resultant data is obtained as an elementary stream corresponding to the MPEG2 standard from an output terminal 159. The elementary stream is data encoded with variable length code in the unit of a macro block.

Figure 7A:
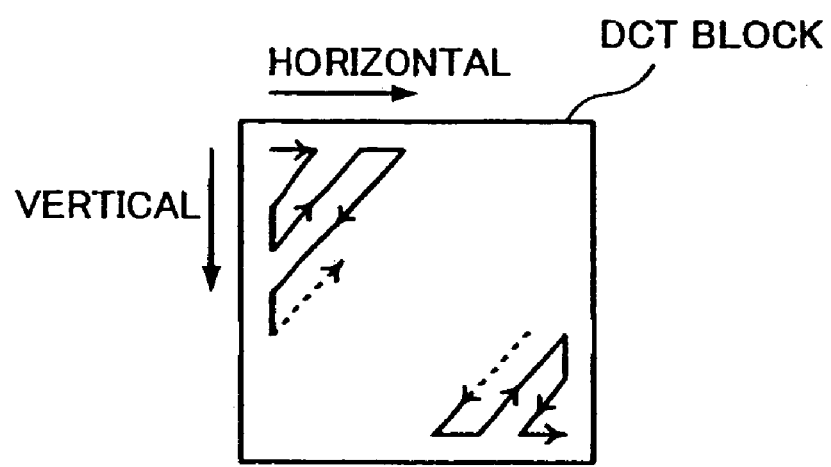
FIGS. 7A and 7B are schematic diagrams showing processes of a zigzag scanning circuit and a VLC circuit.
Figure 7B:
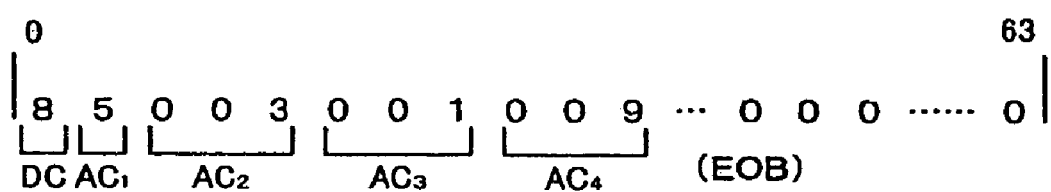

FIGS. 7A and 7B shows outlines of processes of the zigzag scanning circuit 157 and the VLC circuit 158. As shown in FIG. 7A, DCT coefficients are output in the order from a DC component at the upper left position of the DCT block to higher horizontal/vertical frequency components in zigzag scanning method. The zigzag scanning circuit 157 zigzag-scans the DCT coefficients of each DCT block in the order from the DC component to higher horizontal/vertical frequency components.

Thus, as shown in FIG. 7B, a total of 64 DCT coefficients (8 pixels×8 lines) are arranged and obtained in the order of frequency components. The DCT coefficients are supplied to the VLC circuit 158. The VLC circuit 158 encodes the DCT coefficients with variable length code. In other words, the first coefficient is a DC component that is a fixed component. The remaining components (AC components) are assigned respective codes each having a run and a level. As a result, the variable length code encoding process is performed. Codes $AC_1, AC_2, AC_3, \ldots$ are assigned from the lowest frequency (lowest order) coefficient to the highest frequency (highest order) coefficient.

Encoded information of the variable length code encoding process performed in the VLC circuit 158 is supplied to the bit rate controlling circuit 153. The bit rate controlling circuit 153 supplies bit rate control information corresponding to the encoded information and the calculated result of the statistic processing circuit 152 for the complexity of macro blocks to the quantizing circuit 156 so that a proper bit rate can be obtained. The quantizing circuit 156 fixes the length of each GOP corresponding to the bit rate control information.

On the other hand, the dequantizing circuit 163 dequantizes the DCT coefficients and supplies the resultant DCT coefficients to the inverse DCT circuit 162. The inverse DCT circuit 162 decodes the DCT coefficients to picture data. The decoded picture data is supplied to the motion detecting circuit 160 and the motion compensating circuit 161.

According to the embodiment, only an I picture is used, not a P picture and a B picture. Thus, in the structure of the above-described MPEG encoder 102, the structure for compensating the motion of frames or fields can be omitted. In other words, the dequantizing circuit 163, the inverse DCT circuit 162, the motion compensating circuit 161, and the motion detecting circuit 160 can be omitted.

The stream converter 106 rearranges DCT coefficients of the received signal. In other words, the stream converter 106 rearranges DCT coefficients arranged in the order of frequency components of each DCT block corresponding to the MPEG2 standard into DCT coefficients in the order of frequency components of all DCT blocks of the macro block.

Figure 8A:
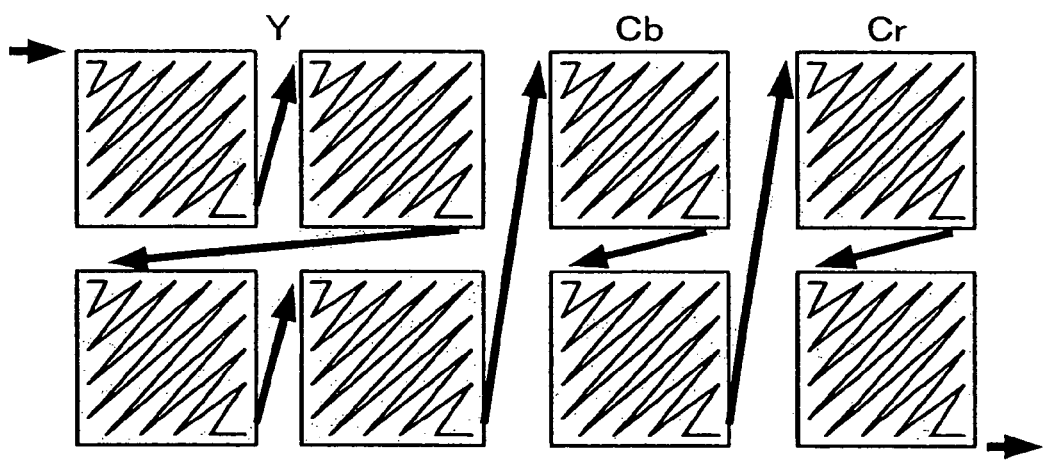
FIGS. 8A and 8B are schematic diagrams showing rearranging processes of DCT coefficients of a stream converter.
Figure 8B:
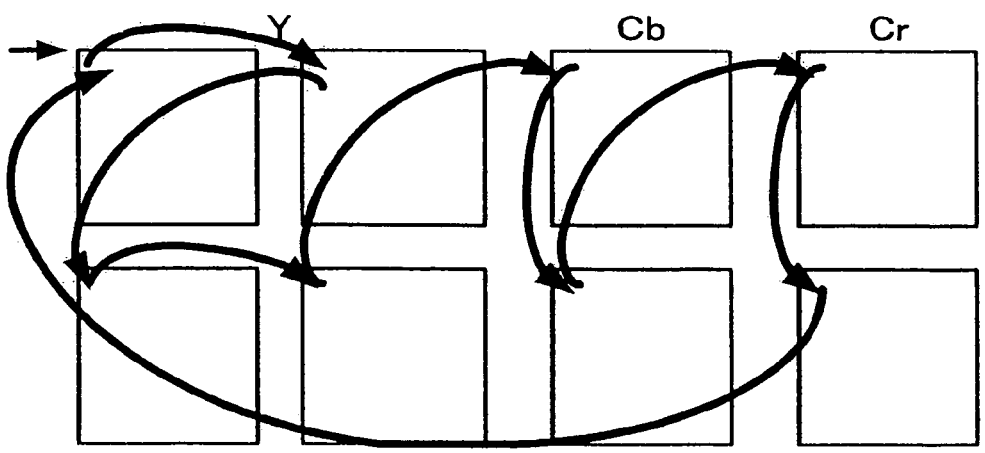

FIGS. 8A and 8B show DCT coefficients rearranged by the stream converter 106. In the case of the (4:2:2) format of which the ratio of a luminance signal Y, a chrominance signal Cb, and a chrominance signal Cr is 4:2:2, one macro block is composed of four DCT blocks ($Y_1$, $Y_2$, $Y_3$, and $Y_4$) of the luminance signal Y, two DCT blocks ($Cb_1$ and $Cb_2$) of the chrominance signal Cb, and two DCT blocks ($Cr_1$ and $Cr_2$) of the chrominance signal Cr.

As described above, the MPEG encoder 102 zigzag-scans DCT coefficients corresponding to the MPEG2 standard. As shown in FIG. 8A, the DCT coefficients of each DCT block are arranged in the order from a DC component to higher frequency components. After the MPEG encoder 102 has zigzag-scanned DCT coefficients for one DCT block, the MPEG encoder 102 zigzag-scans DCT coefficients for the next DCT block so as to arrange the DCT coefficients.

In other words, DCT coefficients of each of the DCT blocks $Y_1$, $Y_2$, $Y_3$, and $Y_4$ and the DCT blocks $Cb_1$, $Cb_2$, $Cr_1$, and $Cr_2$ of the macro block are arranged in the order from the DC component to higher frequency components. As was described above, the variable-length code encoding process is performed in such a manner that codes DC, $AC_1$, $AC_2$, $AC_3$, ... are designated to sets of runs and levels.

The stream converter 106 interprets DCT coefficients encoded with variable length code, detects the ends of individual coefficients, and arranges the DCT coefficients of the DCT blocks of the macro block in the order of higher frequency components as shown in FIG. 8B. In other words, DCT components of the DCT blocks are arranged from DC components to higher frequency components.

In other words, DCT coefficients of individual DCT blocks of the macro block are arranged in the order of $DC(Y_1)$, $DC(Y_2)$, $DC(Y_3)$, $DC(Y_4)$, $DC(Cb_1)$, $DC(Cb_2)$, $DC(Cr_1)$, $DC(Cr_2)$, $AC_1(Y_1)$, $AC_1(Y_2)$, $AC_1(Y_3)$, $AC_1(Y_4)$, $AC_1(Cb_1)$, $AC_1(Cb_2)$, $AC_1(Cr_1)$, $AC_1(Cr_2)$, ... In reality, codes as sets of runs and levels are arranged in the roder of lower frequency components.

To perform the stream conversion in the shortest time period, DCT coefficients should be rearranged with a clock signal of a rate of pixel data so as to secure the transmission rate of the bus that exchange signals. For example, assuming that the pixel rate is 27 MHz/bps (bits per second) and one pixel is composed of eight bits, one pixel becomes three times as large as eight bits (namely, 24 bits). Thus, a band width of 27 MHz×24 bits is required. When data is input and output with a band width of 81 MHz×8 bits or 54 MHz×16 bits, the bit width can be reduced. Thus, it is not necessary to limit the maximum length of each macro block.

When the maximum length of each macro block is limited, a band width with which data for the limited length is transmitted in the transmission time of one macro block is required. For example, when the maximum length of each macro block is limited to 512 bytes, a band width of 27 MHz×8 bits is required.

When an elementary stream of which one macro block exceeds one slice is supplied to the stream converter 106, it may have a function for causing the macro block to be limited to one slice (this function is not shown). When an elementary stream supplied from the terminal 104 is one stripe per slice, the stream converter 106 converts the elementary stream of one stripe per slice into that of one macro block per slice.

In addition, the stream converter 106 may have an overflow protecting function that protects an elementary stream that exceeds the record bit rate of the apparatus (namely, the fixed length of a GOP) from overflowing (this function is not shown). For example, the stream converter 106 substitutes high frequency components of DCT coefficients with zero.

In the example, the stream converter 106 interprets DCT coefficients encoded with variable length code and rearranges the coefficients. However, it should be noted that the present invention is not limited to such an example. In other words, DCT coefficients that have been decoded with which variable length code may be rearranged.

The length of each macro block that has been converted into an elementary stream is the same as the length of each macro block that has not been converted into an elementary stream. The MPEG encoder 102 controls the bit rate so as to fix the length of each GOP. However, the length of each macro block varies. The packing circuit 107 packs data of a macro block in a fixed data frame.

FIG. 9 shows an outline; of a packing process for macro blocks performed by the packing circuit 107. Macro blocks are packed in a fixed data frame having a predetermined data length. The data length of the fixed data frame is matched with the length of one sync block that is the minimum data unit of data that is recorded and reproduced. Thus, the shuffling and error correction code encoding process of the ECC encoder 108 can be conveniently performed. The process is performed at intervals of for example eight macro blocks and they are designated #1, #2, ... , #8.

Figure 9A:
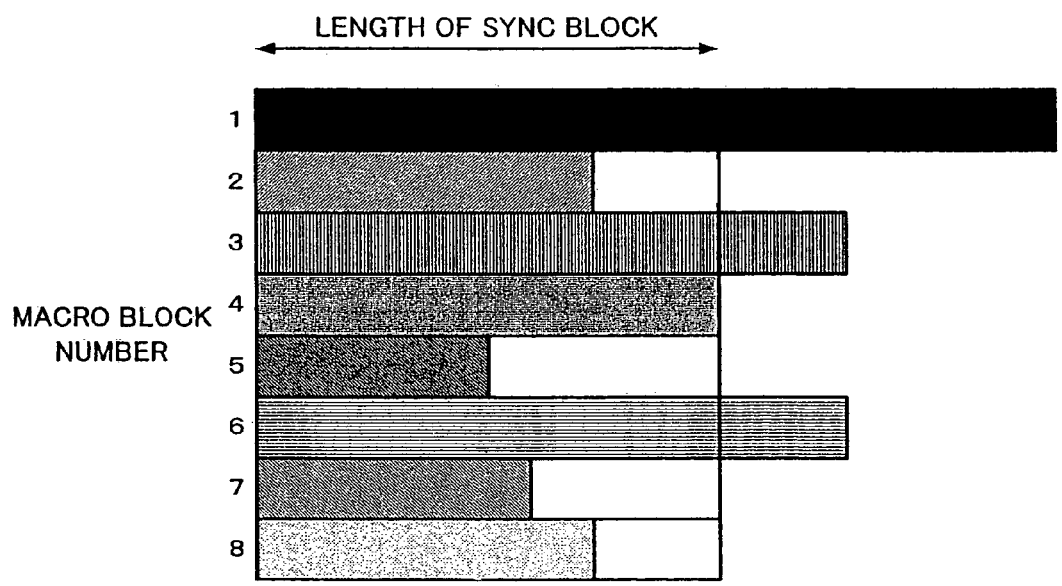
FIGS. 9A and 9B are schematic diagrams showing a packing process.

As shown in FIG. 9A, in the variable length code encoding process, the lengths of eight macro blocks are different from each other. In this example, the length of each of data of macro block #1, data of macro block #3, data of macro block #6 is larger than the length of one sync block as the fixed data frame. On the other hand, the length of each of data of macro block #2, data of macro block #5, data of macro block #7, and data of macro block #8 is smaller than the length of one sync block. The length of data of macro block #4 is almost equal to the length of data of one sync block.

Figure 9B:
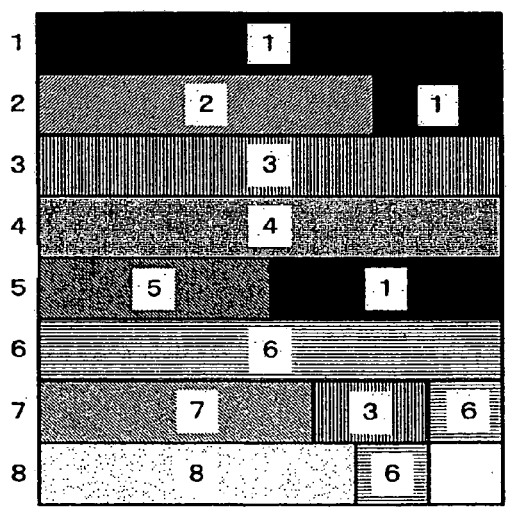

In the packing process, each macro block is packed in the fixed data frame with the length of one sync block. Thus, the length of data that is generated in one frame period is fixed. As shown in FIG. 9B, a macro block larger than one sync block is divided at the position corresponding to the length of one sync block. The overflow portion of the macro block against the length of one sync block is packed to the rear blank portions of the other macro blocks each of which is smaller than the length of one macro block.

In the example shown in FIG. 9B, the overflow portion of macro block #1 against the length of one sync block is packed to the rear blank portion of macro block #2. When the length of macro block #2 and the overflow portion of macro block #1 exceeds the length of one sync block, the remaining overflow portion of macro block #1 is packed to the rear blank portion of macro block #5. Next, the overflow portion of macro block #3 is packed to the rear blank portion of macro block #7. In addition, the overflow portion of macro block #6 is packed to the rear blank portion of macro block #7. The further overflow portion of macro block #6 is packed to the rear blank portion of macro block #8. In such a manner, the individual macro blocks are packed to the fixed data frame with the length of one sync block.

The stream converter 106 can predetermine the length of each macro block. Thus, the packing portion 107 can detect the last end of data of each macro block without need to decode VLC data and check the contents thereof.

When packed data is recorded to a magnetic tape, length information LT is added to the beginning of a macro block in the fixed data frame. The length information LT represents the length of the macro block. When packed data is reproduced from the magnetic tape, the packed data is connected corresponding to the length information LT. Thus, the, macro block data is restored. This process is referred to as depacking process.

Output data of the packing circuit 107 is supplied to an ECC encoder 108. Whenever the ECC encoder 108 receives data for one GOP, the ECC encoder 108 shuffles and rearranges macro blocks thereof corresponding to a predetermined rule and correlates screen positions and record positions of the rearranged macro blocks. Since the macro blocks are shuffled, the resistance against a burst error that takes place as a successive area on the tape can be improved. The packing circuit 107 may have such a shuffling function.

When macro blocks are shuffled, an outer code parity and an inner code parity are added at intervals of predetermined data unit (symbols). Thus, an error correction code encoding process using a product code is performed. First of all, an outer code parity is added to a predetermined number of macro blocks. Next, an inner code parity is added to each of macro blocks having the outer code parity in the direction of the arrangement of the macro blocks. The inner code parity is added in the unit of an inner code block composed of the same data sequence as the fixed data frame used in the packing process. At the beginning of each inner code block, a DID, an ID, and a sync pattern are added. As a result, a sync block is formed.

A data block completed with the inner code parity and the outer code parity is referred to as error correction block.

Data that has been encoded with error correction code is scrambled by a scrambling circuit (not shown). Thus, the frequency components are averaged. The resultant data is supplied to a recording amplifier 110. The recording amplifier 110 record-encodes the data received from the scrambling circuit so that the data is properly recorded on the magnetic tape 120. According to the embodiment, the record-encoding process is performed by a partial response precoder. The data that has been record-encoded is recorded on the magnetic tape 120 by the magnetic head 111.

Next, the reproducing process will be described. A signal recorded on the magnetic tape 120 is reproduced by the reproducing head 130. The reproduced signal is supplied to the reproducing amplifier 131. An equalizer restores the reproduced signal to digital data as a partial response decoding process. At this point, with the Viterbi decoding process, the error rate can be improved.

The reproduced digital data that is output from the reproducing amplifier 131 is supplied to the ECC decoder 132. The ECC decoder 132 detects a sync pattern and extracts a sync block from the reproduced digital data. An inner code block of the sync block is corrected with the inner code parity and written to a predetermined address of a memory (not shown) corresponding to an ID of the sync block. When a symbol has an error that cannot be corrected with an error correction code, an error flag is placed to the symbol. After data for one GOP has been corrected with an inner code, the resultant data is corrected with an outer code using data written in the memory.

When a symbol has an error that cannot be corrected with the error correction code, an error flag is placed to the symbol. The error flag of the outer code error correcting process is supplied to the stream converter 134 (that will be described later).

The data that has been error-corrected is deshuffled and addresses of the data are restored. In other words, when data is recorded, before the error correction code encoding process is performed, the data is shuffled corresponding to a predetermined rule. Thus, when data is reproduced, a deshuffling process is performed for the data. Thus, data is rearranged in the correct order. The deshuffled data is supplied to the depacking circuit 133.

The depacking circuit 133 restores macro blocks packed by the packing circuit 107. In other words, sync blocks correspond to macro blocks. Corresponding to the length information LT placed at the beginning of the payload, data of each macro block is connected. As a result, original macro blocks are restored.

When a high speed reproducing operation at a higher speed than the recording speed is performed for the magnetic tape 120 or when a variable speed reproducing operation at a different speed from the recording speed is performed, the relation between the tracing angle of the rotating head and the helical tracks varies and thereby one track cannot be accurately traced. Thus, since all the signal of one GOP cannot be obtained, the depacking process cannot be performed. In this case, the reproducing operation is performed for each sync block. At this point, data placed after a macro block that is smaller than a sync block is treated as for example zero corresponding to the length information LT. In this case, an error of data can be corrected with an inner code parity. Corresponding to the ID, the deshuffling process can be performed.

Output data of the depacking circuit 133 is supplied as a converted elementary stream to the stream converter 134. The stream converter 134 performs the reverse process of the stream converter 106. In other words, the stream converter 134 rearranges DCT coefficients of a macro block arranged in the order of frequency components into those of each DCT block in the order of frequency components. Thus, the converted elementary stream is inversely converted into an elementary stream corresponding to the MPEG2 standard.

The structure of the stream converter 134 on the reproducing side is the same as that of the stream converter 106 on the recording side. The process of the stream converter 134 on the reproducing side is the same as the process of the steam converter 106 on the recording side. Thus, for simplicity, the detailed description of the stream converter 134 on the reproducing side is omitted.

Before the stream converting process is performed on the reproducing side, an error process should be performed corresponding to the outer code error flag obtained in the ECC decoder 132. In other words, before the stream converting process is performed, when a macro block has an error, DCT coefficients after a frequency component of the error cannot be restored. In this case, data of the error is substituted with a block end code (EOB). The DCT coefficients of the later frequency components are substituted with zero. Likewise, when the high speed reproducing operation is performed, only DCT coefficients corresponding to the sync block length are restored and the remaining coefficients are substituted with zero data.

Since DCT coefficients of DCT blocks are arranged in the order from DC components to higher frequency components, even if DCT coefficients after a particular position are ignored, DCT coefficients can be placed in each of DCT blocks of the macro block.

As with the recording side, the input signal and output signal of the stream converter 134 should have a sufficient transmission rate (band width) corresponding to the maximum length of macro blocks. When the length of each macro block is not limited, it is preferred to designate a band width three times as large as the pixel rate.

The elementary stream that is output from the stream converter 134 is supplied to for example the SDTI transmitting circuit 135. The SDTI transmitting circuit 135 adds a synchronous signal or the like to the elementary stream and outputs the resultant elementary stream having a predetermined signal format. The resultant elementary stream is output as an SDTI format elementary stream corresponding to the MPEG2 standard from the terminal 136.

The elementary stream that is output from the stream converter 134 can be also supplied to the MPEG decoder 137. The MPEG decoder 137 has the structure of a decoder (not shown) corresponding to the MPEG2 standard. The elementary stream is decoded by the MPEG decoder 137 and obtained as a digital video signal from the terminal 138.

Next, the processes of the packing circuit 107 and the ECC encoder 108 shown in FIG. 1 will be described in detail. FIG. 10 shows the structures of the packing circuit 107 and the ECC encoder 108 on the recording side of the recording and reproducing apparatus according to the embodiment shown in FIG. 1.

A digital video signal is supplied from a terminal 201 to a video encoder 202. The video encoder 202 compression-encodes the digital video signal and rearranges DCT coefficients. An output signal of the video encoder 202 is supplied to a packing and outer code generating portion 230. In addition, system data (for example, video AUX data) is supplied from a terminal 204 to the packing and outer code generating portion 230.

A packing circuit 203 of the packing and outer code generating portion 230 packs the digital video signal and the system data for each packet and rearranges the data so that an outer code encoder 205 on the next stage can add an outer code parity to the digital video signal. The rearranged data is supplied to the outer code encoder 205. The outer code encoder 205 adds the outer code parity to the digital video data. The resultant data is supplied to a rearranging circuit 206. The rearranging circuit 206 rearranges the digital video data in the recording order. The resultant digital video signal is supplied to a mixing circuit 207.

On the other hand, digital audio data is supplied from a terminal 210 to a delaying circuit 211. The delaying circuit 211 adjusts the delay amount of the digital audio data. The delayed digital audio data is supplied to the packing and outer code generating portion 230. A rearranging circuit 212 of the packing and outer code generating portion 230 rearranges the digital audio data along with audio AUX data supplied from a terminal 213 so that an outer code encoder 214 disposed on the downstream of the rearranging circuit 212 can add an outer code parity to the digital audio data and the audio AUX data for each error correction block. The rearranged data is supplied to the outer code encoder 214. The outer code encoder 214 adds an outer code parity to the data received from the rearranging circuit 212. The resultant data is supplied to a rearranging circuit 215. The rearranging circuit 215 rearranges the data supplied from the outer code encoder 214. The rearranged digital audio signal and audio AUX data (hereinafter, they are together referred to as digital audio signal) are supplied to a mixing circuit 207.

The mixing circuit 207 rearranges the supplied digital video signal and digital audio signal in the recording order. As was described above, a video sector, an audio sector, and a video sector are recorded on one track in the head scanning direction. For example, the supplied digital video signal and digital audio signal are rearranged in such an order.

An ID adding circuit 216 adds an ID to the rearranged data for each packet. A sync adding circuit 218 adds a sync pattern to the data supplied from the inner code encoder 217 for each packet. The sync adding circuit 218 supplies sync blocks to a recording amplifier 219. The recording amplifier 219 converts the sync blocks into a signal that can be recorded on a magnetic tape 221. A recording head 220 records the signal on the magnetic tape 221.

Next, a null sync that is a feature of the present invention will be described. As was described above, according to the present invention, a sync block containing length information LT representing [0] and a data portion filled with [00]s is defined as a null sync.

Null syncs are used to match the number of sync blocks of one picture format with that of another picture format so that the number of sync blocks becomes flexible in video signals of a plurality of formats are integrally recorded. Thus, the number of null syncs depends on each picture format. In contrast, a conventional sync block is defined as a block that contains for example variable length encoded data, a picture header, and user data.

Although the contents of a null sync are not defined, it requires a predetermined storage capacity. For example, in the format of which the length of one sync block is 128 bytes and 10 null syncs are required, a data area of 1280 bytes is allocated to a record area.

However, according to the present invention, a null sync is used for the packing process of an overflow portion of a packet by the packing circuit 107. In other words, according to the present invention, a null sync is handled in the same manner as a sync block that is smaller than a fixed data frame for the packing process. An overflow portion is packed to a blank area of a null sync. Thus, the record area of a null sync on the record medium can be effectively used. In addition, picture data can be recorded and reproduced in high quality.

Figure 11:
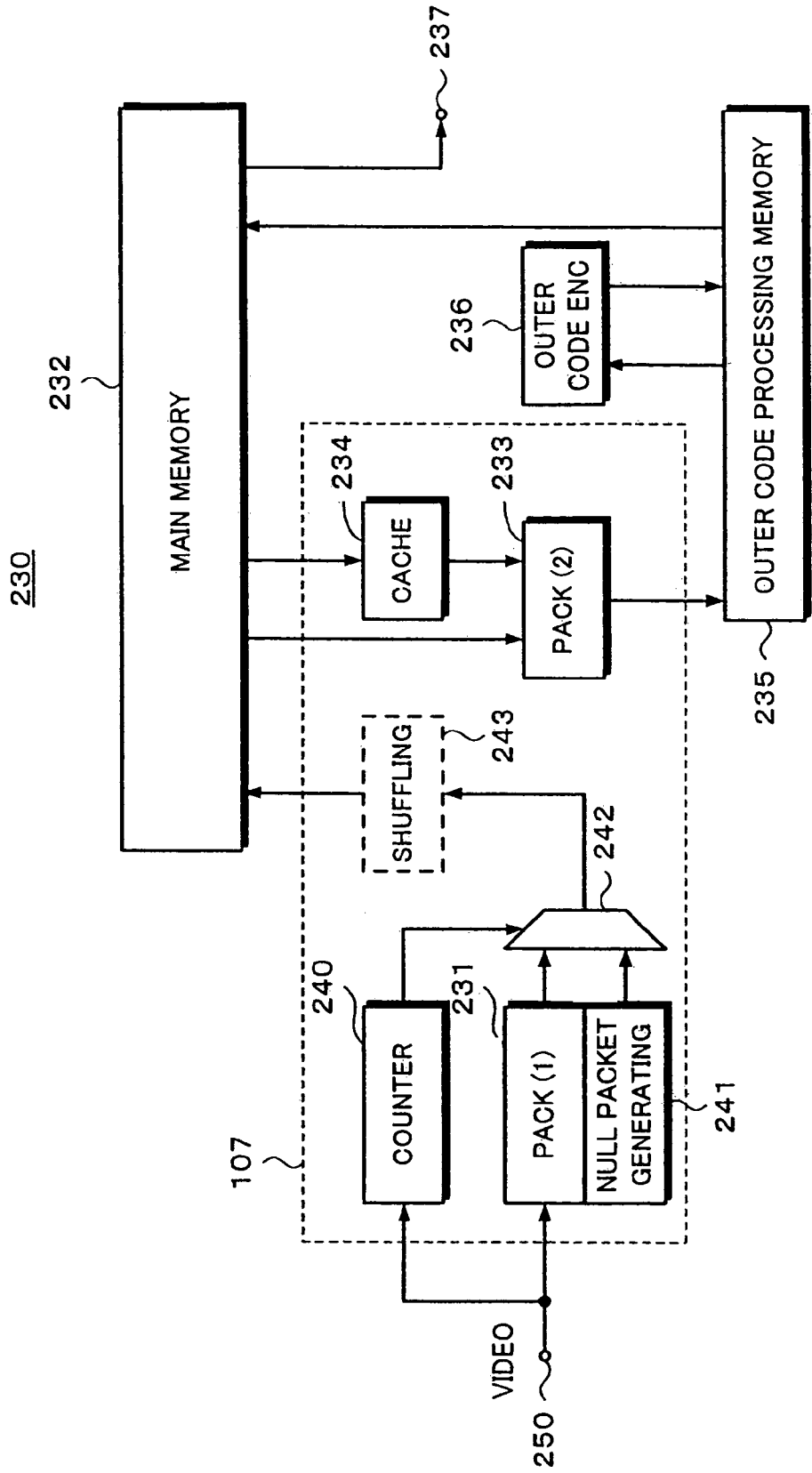
FIG. 11 is a block diagram showing the structure of a packing portion.

FIG. 11 shows an example of the structure of the packing circuit 107 according to the embodiment. The packing circuit 107 contains a part of the ECC encoder 108. It is assumed that the number of required null syncs (null packets) has been defined corresponding to the format of a video signal to be handled. A digital video signal is supplied from a terminal 250 to a pack (1) circuit 231 and a counter 240 of the packing circuit 107.

As was described above, the digital video signal is successively transmitted as an elementary stream corresponding to the MPEG2 standard in such a manner that one screen is divided into macro blocks, each macro block is divided into DCT blocks, each DCT block is processed by a DCT method, and the resultant DCT block is quantized. The signal supplied from the terminal 250 is encoded with variable length code corresponding to pixel information of each macro block. Thus, the lengths of the resultant codes vary one after the other.

The pack (1) circuit 231 divides each macro block into a large portion and a small portion that are larger or smaller than a data length defined corresponding to a record format (hereinafter the data length is referred to as fixed data frame length). For example, according to the embodiment, corresponding to the length of each sync block, data is divided corresponding to the length of the payload excluding the portion of the length information LT as the fixed data frame length (see. FIGS. 4A to 4E). Each of the divided data portions is supplied to a first input terminal of a switch circuit 242.

Figure 12:
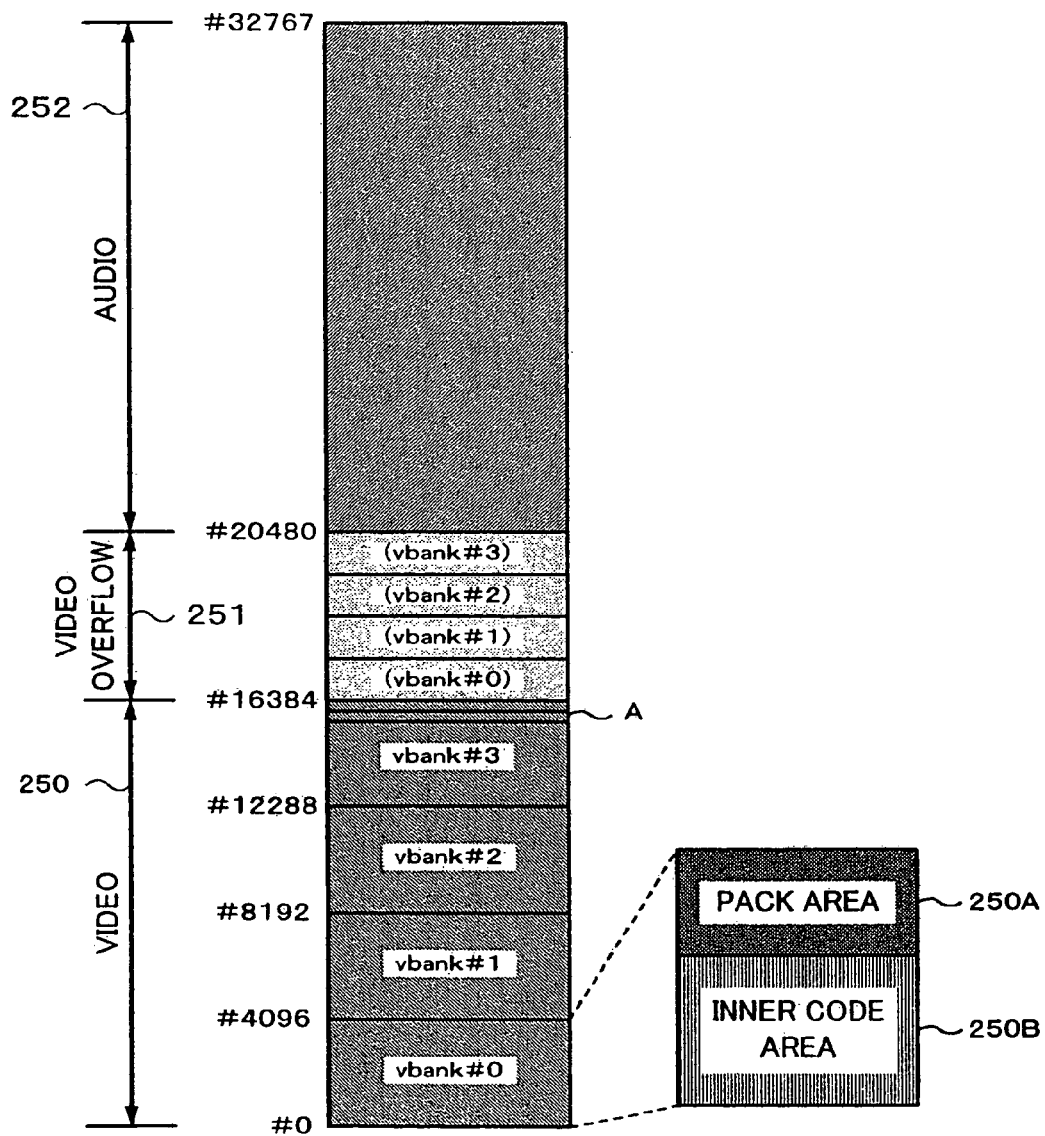
FIG. 12 is a schematic diagram showing an example of the address structure of a main memory.

The switch circuit 242 initially selects the first input terminal. Thus, each of the divided data portions that are output from the pack (1) circuit 231 is supplied to a main memory 232 through the switch circuit 242. As shown in FIG. 12, the main memory 232 has a plurality of areas of a video area 250, an overflow area 251, and an audio area 252. Each of the video area 250 and the overflow area 251 has a plurality of banks with which data of a plurality of pictures can be successively processed. Each bank corresponds to one picture. Each of the banks of the video area 250 is composed of a pack area 250A and an inner code area 250B. In FIG. 12, a portion A represents an area for one packet (one sync block) of a video signal.

In the divided data portions, a portion that is larger than the fixed data frame is stored as overflow data to the overflow area 251 of a relevant bank of the main memory 232. On the other hand, a portion that is smaller than the fixed data frame is stored to the pack area 250A of a relevant bank of the video area 250 of the main memory 232.

When a macro block having a length of 160 bytes is received against a record format of which the packet length is 128 bytes, the first portion of 128 bytes is stored in the pack area 250A of the main memory 232 and the second portion of 32 bytes is stored in the overflow area 251.

A null packet generating circuit 241 of the packing circuit 107 generates a null sync that has been defined. In other words, the null packet generating circuit 241 generates a data packet as a null sync that contains length information LT having a length of [0] and a data portion filled with [00] and that is written to the main memory 232. When the length of one sync block is 11 bytes and three bytes thereof is reserved as the length information LT, data [00] that fills the eight bytes preceded by the length information LT is generated. The null packet is supplied to a second input terminal of the switch circuit 242.

The counter 240 counts the number of input macro blocks. The switch circuit 240 selects one of the two input terminals corresponding to the count value supplied from the counter 240. The number of macro blocks per data encoding unit (for example, per frame, per field, or per picture) depends on the recording format to be handled. In this example, it is assumed that one data encoding unit is one picture. The counter 240 counts the number of macro blocks that are input. When it is determined that all macro blocks of one data encoding unit have been input and supplied to the pack (1) circuit 231, the switch circuit 242 switches the first input terminal to the second input terminal.

When the switch circuit 242 selects the second input terminal, null packets generated by the null packet generating circuit 241 are stored to the pack area 250A of the main memory 232. Since data packets of conventional macro block and null packets of null syncs are supplied from the same path, the conventional data packets and null packets stored in the main memory 232 can be handled in the same manner in the later processes.

In such a structure, when data is stored to the main memory 232, a shuffling circuit 243 denoted by a dotted line box can shuffle video data only by changing write addresses of the video data to the main memory 232. In this case, it is not necessary to distinguish conventional data packets from null packets.

After the process of the pack (1) circuit 231 has been completed and data packets for one picture and a predetermined number of null packets have been supplied to the main memory 232, a process of a pack (2) circuit 133 is performed. At this point, a video signal that is read from the pack area 250A of the main memory 232 is supplied to the pack (2) circuit 233. In addition, overflow data is read from the overflow area 251 of the main memory 232. The overflow data is supplied to the pack (2) circuit 233 through a cache 234 composed of for example a dual-part SRAM (namely, a FIFO).

The pack (2) circuit 233 successively reads data as packets from the pack area 250A of the main memory 232. When the packet length of a packet that is read from the pack area 250A is smaller than the fixed data frame length corresponding to the length information LT, the pack (2) circuit 233 inserts overflow data that is read from the overflow area 251 into the packet in such a manner that the sum of the packet length of the packet read from the pack area 250A and the length of the overflow data does not exceed the fixed data frame length.

When the overflow data is inserted into the packet, if the length of the resultant data exceeds the fixed data frame, the portion that exceeds the fixed data frame is also overflow data. This portion is inserted into the rear portion of another data portion that is read from the pack area 250A and that is smaller than the fixed data frame.

When a data packet that is read from the pack area 250A is a null packet, since the length information LT of the null packet is [0], overflow data can be packed after the length information LT of the packet until the resultant length does not exceed the fixed data frame length.

Data that is packed and inserted into the fixed data frame by the pack (1) circuit 231 and the pack (2) circuit 233 is written to an outer code processing memory 235.

Before the process of the pack (2) circuit 233 is performed, when overflow data is pre-written to the cache 234, the main memory 232 can be prevented from being concentratedly accessed. Thus, the process speed of the pack (2) circuit 233 can be improved. The cache 234 can be omitted.

The outer code processing memory 235 is composed of for example an SRAM (Static RAM). The SRAM has a storage capacity sufficient for a process for adding an outer code parity to video data. For example, the outer code processing memory 235 has a storage capacity for storing one error correction block. The size of the error correction block depends on the format of a video signal to be handled. When signals of a plurality of formats are handled as with the embodiment, it is required that the size of the outer code processing memory 235 be the same as the size of the maximum error correction block.

The pack (2) circuit 233 packs data that is read from the main memory 232 and successively writes the packed data to the outer code processing memory 235. When the amount of the data written to the outer code processing memory 235 becomes a predetermined value (namely, the size of one error correction block), the process of the pack (2) circuit 233 is temporarily stopped. The outer code encoder 236 adds an outer code parity to the data written to the outer code processing memory 235. Thus, the outer code encoder 236 performs an outer code encoding process.

In other words, the outer code encoder 236 reads data in the line direction from the outer code processing memory 235 and generates an outer code parity. The generated outer code parity is written to the outer code processing parity 235. For example, the outer code parity is added in the line direction of the error correction block stored in the outer code processing memory 235.

As was described above, after null packets and conventional data packets are stored to the main memory 232, they are handled in the same manner. Thus, the outer code parity is also added to null packets by the outer code encoder 236.

After the outer code encoding process for one error correction block is completed, data to which the outer code parity has been added is read from the outer code processing memory 235. The resultant data is transformed and rearranged so that it can be easily processed on the downstream circuits. The resultant data is written to the main memory 232. At this point, as was described above, the data is written to the inner code area 250B of a relevant bank of the video area 250. The data is rearranged by controlling addresses of data stored in the main memory 232 in such a manner that data to which an outer code parity has been added in the line direction thereof is read in the column direction. The data is read in for example the column direction from the inner code area 250B, supplied to the inner code encoder 217, and the inner code parity is added to each packet.

In such a manner, the process for one error correction block is completed. After the process of the pack (2) circuit 233 is completed, the outer code encoding process is performed. A sequence of processes of which data to which an outer code parity has been added is rewritten to the main memory 232 is repeated a number of times corresponding to the number of error correction blocks (for example, 32 blocks) defined in the format of a video signal to be handled. Thus, the video encoding process for one picture is completed.

FIGS. 13A to 14B show a real example of the packing process using null packets. In this example, it is assumed that the sync block length as the fixed data frame length is 11 bytes and three bytes thereof are used for the length information LT. In addition, it is assumed that one frame is processed with 10 macro blocks and five null syncs. The packing process is performed in such a unit. The 10 macro blocks are denoted by MB0, MB1, . . . , MB9. Likewise, the five null syncs are denoted by NULL1, NULL2, . . . , NULL5. In this example, it is assumed that the shuffling circuit 243 does not perform a shuffling process.

Figures 13A, 13B, 13C:
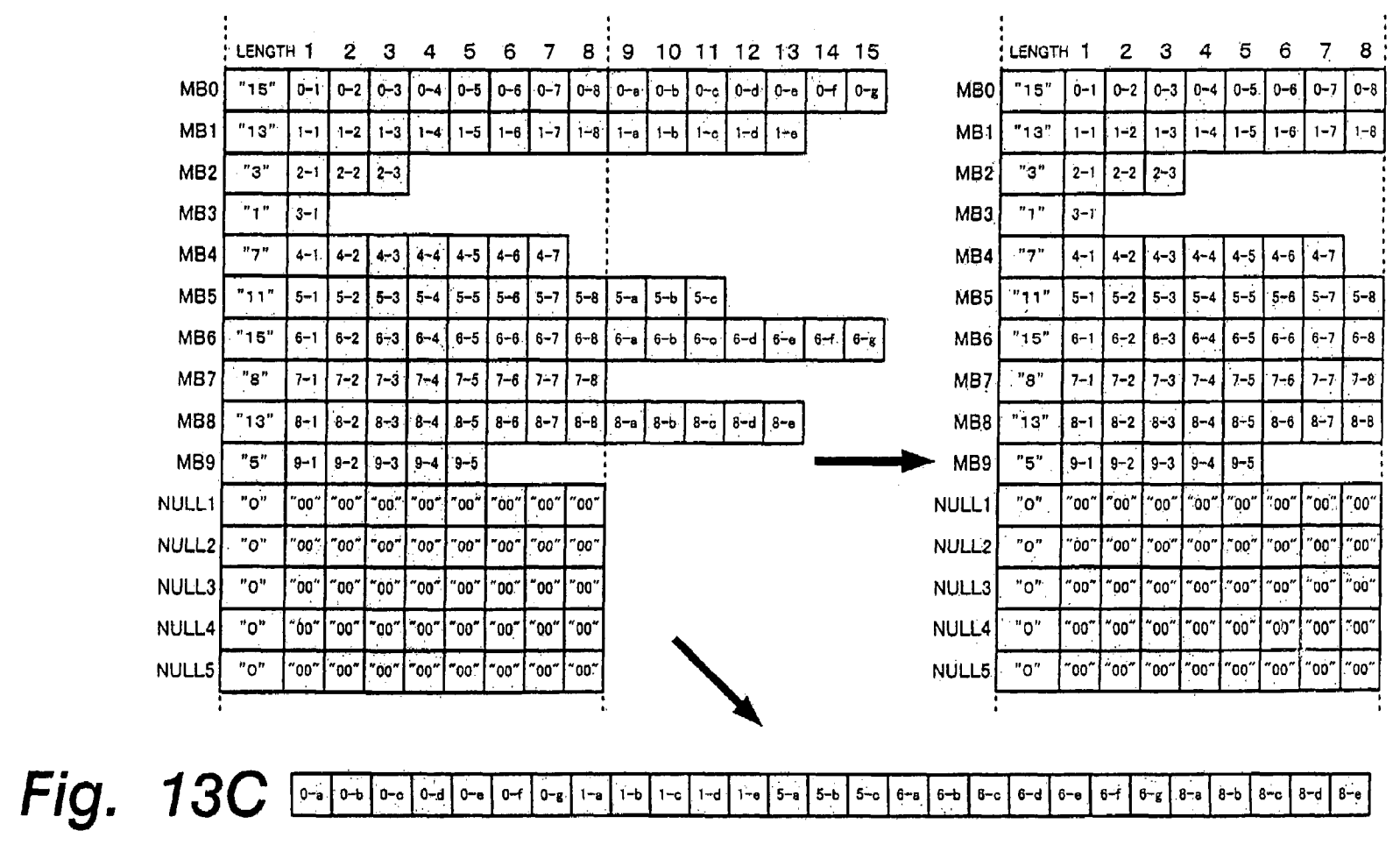

FIGS. 13A to 13C show the processes of the pack (1) circuit 231. FIG. 13A shows an example of data that is input to the pack (1) circuit 231. Data packets of the macro block MB0 are successively supplied to the pack (1) circuit 231. The macro block MB0 has a length of 15 bytes excluding length information LF. Thus, in the macro block MB0 that is supplied to the pack (1) circuit 231, the three byte area of the length information LT contains [15]. The length information LT is followed by data [0-1], [0-2], . . . , [0-g] of one byte each. The sync block length including the length information LT is 11 bytes. Thus, the pack (1) circuit 231 divides the packets of the macro block MB0 at data [0-8] and stores the first portion and the second portion as the data portion and the overflow portion, respectively, to the pack area 250A of a relevant bank of the main memory 232. The pack (1) circuit 231 repeatedly performs such a process for the macro blocks MB0 to MB9. The counter 240 counts the number of macro blocks. When the number of the input macro blocks becomes the total number of macro blocks of each frame (in this example, 10 macro blocks), the switch circuit 242 switches the first input terminal to the second input terminal. Thus, the data path to the main memory 232 is switched from the pack (1) circuit 231 to the null packet generating portion 241.

The null packet generating circuit 241 generates five null packets NULL1, NULL2, . . . , NULL5. The generated null packets are stored to the pack area 250A of a relevant bank of the main memory 232 As shown in FIG. 13A, each null packet contains the length information LT representing [0] and data areas filled with [00]s.

Thus, as shown in FIG. 13B, in the macro blocks MB0 to MB9, portions smaller than the sync block length are successively stored to the pack area 250A of the relevant bank of the main memory 232. Thereafter, the null packets NULL1 to NULL5 are successively stored. As shown in FIG. 13C, in the macro blocks MB0 to MB9, overflow portions exceeding the sync block length are successively stored in the overflow area 251 of the relevant bank of the main memory 232.

Thereafter, data is read from the main memory 232. The data is supplied to the pack (2) circuit 233. The pack (2) circuit 233 reads data for each column from the pack area 250A of the relevant bank of the main memory 232. When data is read, if the data length including the length information LT is less than 11 bytes, the pack (2) circuit 233 reads data of a predetermined length corresponding to the length information LT from the overflow area 251 of the relevant bank of the main memory 232 so that the total of the data length of the data that is read from the pack area 250A and the data length of data that is read from the overflow area 251 becomes 11 bytes. The data that is read from the overflow area 251 is packed after the data that is read from the pack area 250A of the relevant bank.

Figures 14A, 14B:
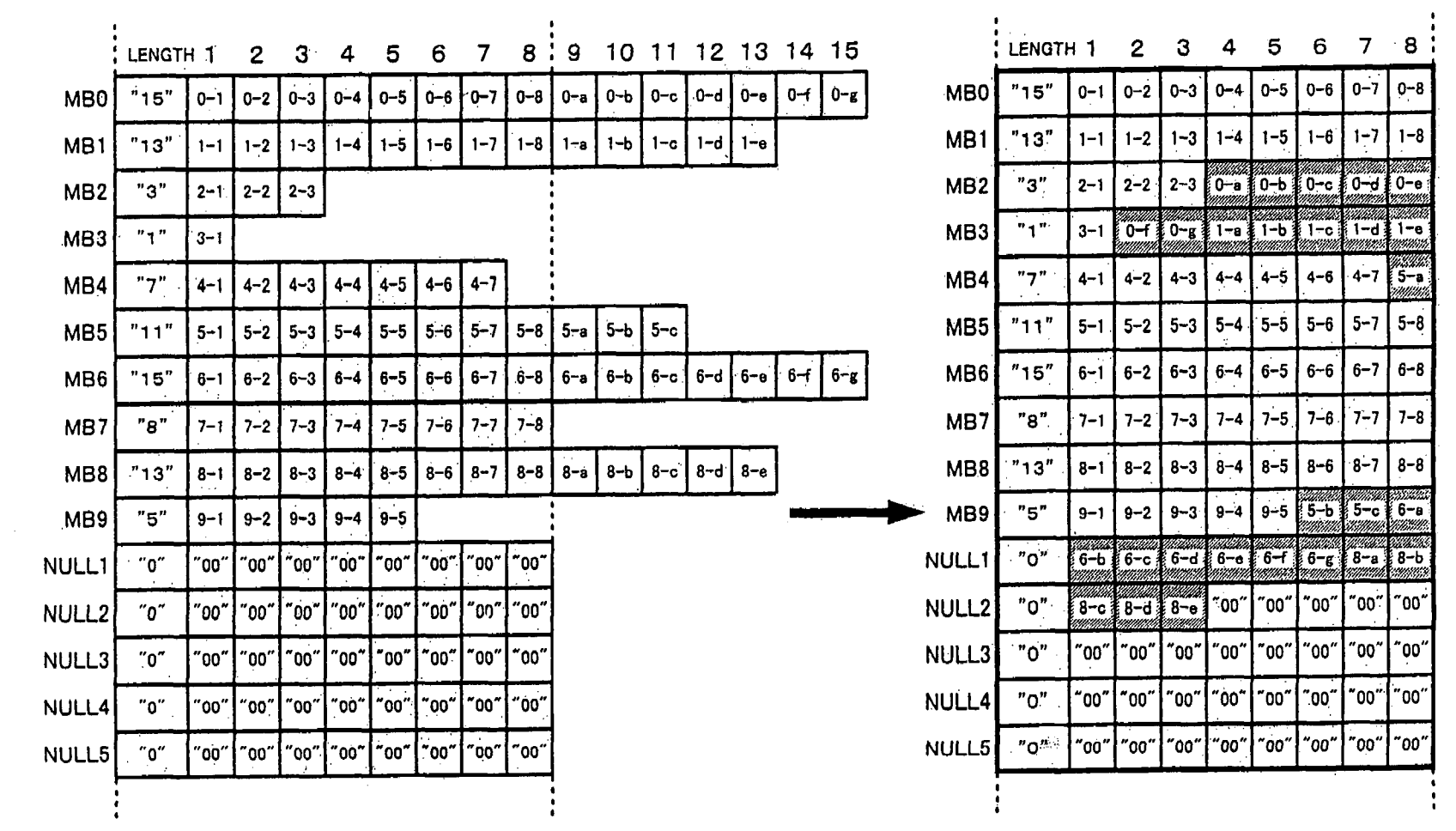

FIGS. 14A and 14B show the result of the process of the pack (2) circuit 233. FIG. 14A shows data packets required for the process for one frame as with FIG. 3A. In this example, 10 macro blocks MB0 to MB9 and five null packets NULL1 to NULL5 are required for the process for one frame. The 10 macro blocks MB0 to MB9 and five null packets NULL1 to NULL5 are packed in the sync block length that is the fixed data frame length as denoted by a hatched portion of FIG. 14B by the processes of the pack (1) circuit 231 and the pack (2) circuit 233. The packed data is stored to the outer code processing memory 235.

In other words, the length information LT of the macro block MB2 represents that the data portion is composed of three bytes. Thus, it is clear that the total length of the macro block MB2 is smaller than 11 bytes. Thus, data that is read from the overflow area is packed after the data portion of the macro block MB2 for five bytes ([0-a] to [0-e]). The length information LT of the next macro block MB3 represents that the data portion is composed of one byte. Thus, it is clear that the total length of the macro block MB3 is smaller than 11 bytes. Data preceded by [0-e] that has been packed to the macro block MB2 is read from the overflow area and packed to the after the data portion of the macro block MB3.

In this example, when the last macro block MB9 is packed, data that has not packed is left in the overflow area. The remaining data is packed in null packets. As defined above, the length information LT of each null packet is [0]. Thus, the remaining data is packed after the length information LT of each null packet.

For example, as shown in FIG. 14B, after the length information LT of the null packet NULL1, data of eight bytes is read from the overflow area 251 of the relevant bank and packed to the null packet NULL1. Thus, the length of the null packet NULL1 becomes 11 bytes. At this point, data of three bytes is left in the overflow area 251 of the relevant bank. This data is packed to the next null packet NULL2. In such a manner, overflow data is packed to sync blocks as null packets generated by the null packet generating circuit 241.

Thus, according to the present invention, overflow data is packed using null packets. Consequently, the storage capacity of a record medium can be effectively used. In addition, when the compression efficiency of one picture is low and there are many macro blocks that are larger than the fixed data frame, the probability of which overflow data is discarded is low. Thus, a picture can be reproduced in high quality.

The shuffling circuit 234 performs a shuffling process for data stored in the pack area 250A of the relevant bank. When the depacking circuit 133 depacks data, after the overflow data is restored to the original positions, the deshuffling process is performed.

Next, a modification of the embodiment will be described. In FIG. 13B, when a null packet is stored in a particular area of the pack area 250A of the main memory 232 (hereinafter, the particular area is referred to as nul packet area), regardless of whether a macro block is stored in another area of the main memory 232, the null packet area contains the length information LT representing [0] and a data portion filled with [00]s. This is because the contents of the null packet area do not vary depending on whether or not the packing process is performed.

In other words, the packing process of the pack (2) circuit 233 is performed when data is moved from the pack area 250A of the main memory 232 to the outer code processing memory 235. In addition, data to which an outer code parity has been added by the outer code encoder 236 is written to the inner code area 250B of the main memory 232.

This applies to the case that the shuffling process is performed by the shuffling circuit 243. This is because the shuffling pattern depends on the format of video data to be handled. Before the packing process is performed in the main memory 232, the positions of null packets are predetermined.

In the modification of the embodiment, using the characteristic of which the contents of a null packet area does not vary depending on whether the packing process is performed, the generating process and the transferring process for null packets can be more effectively performed. The modification of the embodiment can be accomplished with the structure shown in FIG. 11.

In the modification, all addresses of the main memory 232 or expected addresses for null packets are filled with data [00]s. For example, when the recording and reproducing apparatus 100 is initially activated, all addresses of the memory 232 are filled with data [00]s. Alternatively, when the apparatus 100 is initially activated, corresponding to the number of null packets given by formula (1) that depends on the format of video data to be handled, expected addresses for null packets in the pack area 250A of the memory 232 are filled with data [00]s. Thus, the transferring process for transferring null packet data from the null packet generating circuit 241 to the main memory 232 can be omitted.

On the other hand, the length information LT representing [0] is always transferred to the main memory 232. This is because when the length information LT of a null packet is destroyed due to for example a malfunction, since the length [0] as a null sync is lost, the depacking process cannot be correctly performed.

Thus, according to the modification, all areas of the main memory 232 or null packet areas of the pack area 250A corresponding to the format for video data to be handled are filled with data [00]s. The number of input macro blocks is counted by the counter 240. When a predetermined number of macro blocks are input, the switch circuit 242 switches one input terminal to another input terminal. In addition, the null packet generating circuit 241 generates a predetermined number of times the length information LT that represents [0] and writes it to predetermined addresses of the main memory 232. Since it is not necessary to transfer data [00]s, the circuit scale can be more reduced than the embodiment.

Real effects of the examples shown in FIGS. 13A to 14B will be described. According to the embodiment, it is necessary to transfer data of five null packets each of which is composed of 11 bytes (thus, a total of 55 bytes) from the null packet generating circuit 241 to the main memory 232. However, according to the modification, the data that should be transferred for each null packet is only three bytes of the length information LT. Thus, when five null packets are transferred, the data to be transferred is only 15 bytes.

Generally, since the length of each sync block exceeds 100 bytes, according to the modification, the amount of data transferred from the null packet generating circuit 241 to the main memory 232 can be remarkably reduced. Thus, the access times of the main memory 232 can be reduced.

In the above-described examples, the stream converter 106 rearranges DCT coefficients of each DCT block arranged in the order of frequencies to those of a plurality of DCT blocks of a macro block in the order of frequencies. However, it should be noted that the present invention is not limited to such an example. In other words, the present invention can be applied to an apparatus that does not use the stream converter 106 that rearranges DCT coefficients. For example, the present invention can be applied to the case that an MPEG elementary stream is directly used.

As was described above, according to the present invention, with null syncs each containing length information that represents [0] and a data portion filled with [00]s, formats corresponding to a plurality of record rates can be structured.

In addition, according to the present invention, since null syncs are used to pack overflow data, the storage capacity of the record medium can be effectively used and the picture quality can be improved.

In addition, according to the present invention, the null packet generating circuit is disposed adjacent to the circuit that divides an input data packet into an overflow portion and a non-overflow portion and separately stores them to the main memory. One of the output paths of these circuits is selected. Thus, in the packing process performed in recording data or in the depacking process performed in reproducing data, null syncs can be handled in the same manner as conventional sync blocks. As a result, the circuit scale can be reduced. Thus, video data including null syncs can be shuffled.

In addition, according to the modification, when null syncs are generated, only the length information thereof is transferred. Thus, the band width of data to be transferred is reduced. Consequently, the circuit scale of the null packet generating circuit can be reduced. In addition, the nurser of memories used in the apparatus can be reduced.

The invention claimed is:

1. A recording apparatus for packing digital data that is input as packets each of which has a variable length to a block having a unit length of an error correction encoding process and encoding the packed block with error correction code that is a product code, comprising:

means for packing data packets each of which has a variable length to a plurality of first blocks from the beginning thereof and packing an overflow portion of a data packet that is larger than the unit length to a blank portion of the first blocks to which a data block that is smaller than the unit length has been packed;

means for generating a second block that contains a data packet whose length is 0 and the overflow portion;

record data forming means for encoding a data block composed of a plurality of first blocks and a plurality of second blocks with error correction code that is a product code, adding a synchronous pattern and an ID to each block having the unit length, and forming record data; and recording means for recording the record data formed by said record data forming means to a record medium;

wherein the overflow portion exceeding the unit length is successively stored in an overflow area of a memory;

whereby said overflow portion of said data packet is detected on the basis of length information associated with said data packet.

* * * * *

UNITED STATES PATENT AND TRADEMARK OFFICE
CERTIFICATE OF CORRECTION

PATENT NO.        : 7,526,187 B2                                              Page 1 of 1
APPLICATION NO. : 11/092436
DATED             : April 28, 2009
INVENTOR(S)       : Satoshi Takagi et al.

It is certified that error appears in the above-identified patent and that said Letters Patent is hereby corrected as shown below:

Title page Add

Item
    --(30)    Foreign Application Priority Data

October 21, 1998    JP    10-299454.--

Signed and Sealed this

Fourteenth Day of July, 2009

JOHN DOLL
*Acting Director of the United States Patent and Trademark Office*